United States Patent [19]

Yasumura

[11] Patent Number: 5,450,307
[45] Date of Patent: Sep. 12, 1995

[54] SWITCHING POWER SOURCE APPARATUS

[75] Inventor: Masayuki Yasumura, Kanagawa, Japan

[73] Assignee: Sony Corporation, Tokyo, Japan

[21] Appl. No.: 192,039

[22] Filed: Feb. 4, 1994

[30] Foreign Application Priority Data

Feb. 19, 1993 [JP] Japan .................. 5-053244

[51] Int. Cl.⁶ .......................................... H02P 13/00
[52] U.S. Cl. ...................... 363/47; 363/46; 363/78; 363/89
[58] Field of Search ................. 363/45, 46, 47, 48, 363/17, 18, 78, 84, 89, 126

[56] References Cited

U.S. PATENT DOCUMENTS

| | | | |
|---|---|---|---|
| 4,771,373 | 9/1988 | Rademaker | 363/86 |
| 5,132,606 | 7/1992 | Herbert | 323/266 |
| 5,166,869 | 11/1992 | Hesterman | 363/25 |

Primary Examiner—Peter S. Wong
Assistant Examiner—Shawn Riley
Attorney, Agent, or Firm—William S. Frommer; Alvin Sinderbrand

[57] ABSTRACT

A switching power source apparatus for producing power signals. The apparatus includes a rectification circuit for rectifying received alternating voltage signals, a smoothing circuit for smoothing the rectified signals and a switching power supply circuit for producing the power signals. The apparatus may include a circuit for extracting low voltage signals from the switching power supply circuit and for superposing such low voltage signals on the smoothed rectified signals so as to reduce a ripple component present in the smoother rectified signals. The smoothing circuit and the switching power supply circuit may utilize a common switching device and/or a common frequency switching signal.

63 Claims, 38 Drawing Sheets (PRIOR ART)
FIG. 2 (a) $V_{CP1}$
FIG. 2 (b) $I_{CP1}$
FIG. 2 (c) $V_2$
FIG. 2 (d) $I_2$
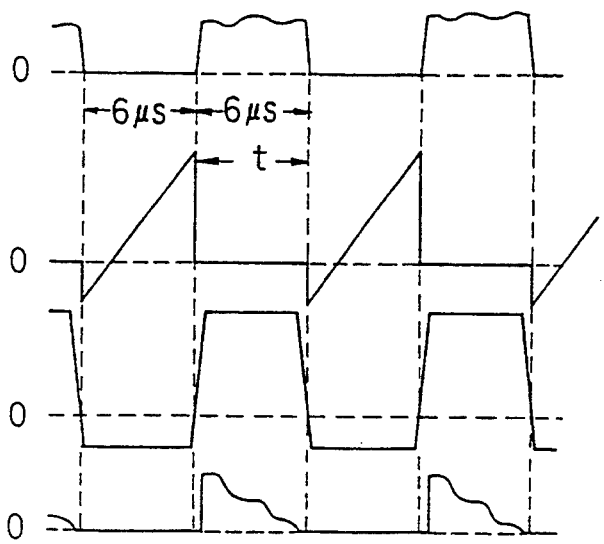
FIG. 2 (e) $V_{CP3}$
FIG. 2 (f) $I_{CP2}$
FIG. 2 (g) $I_{CP3}$
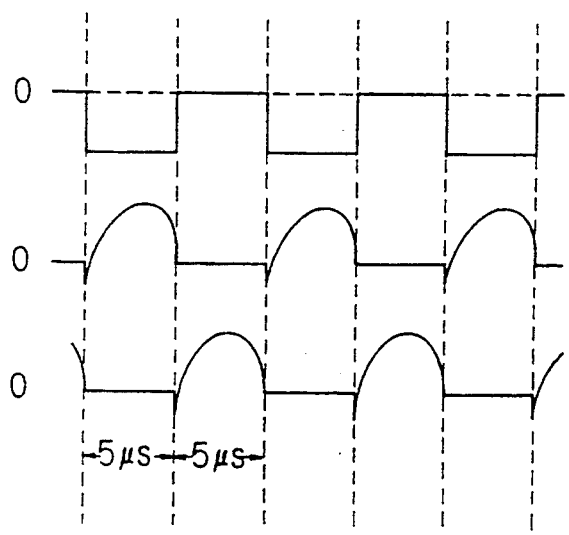

(PRIOR ART)
FIG. 3 (a) $V_{AC}$
FIG. 3 (b) $V_{CP1}$
FIG. 3 (c) $I_{CP1}$
FIG. 3 (d) $V_1$
FIG. 3 (e) $E_i$
FIG. 3 (f) $I_{AC}$
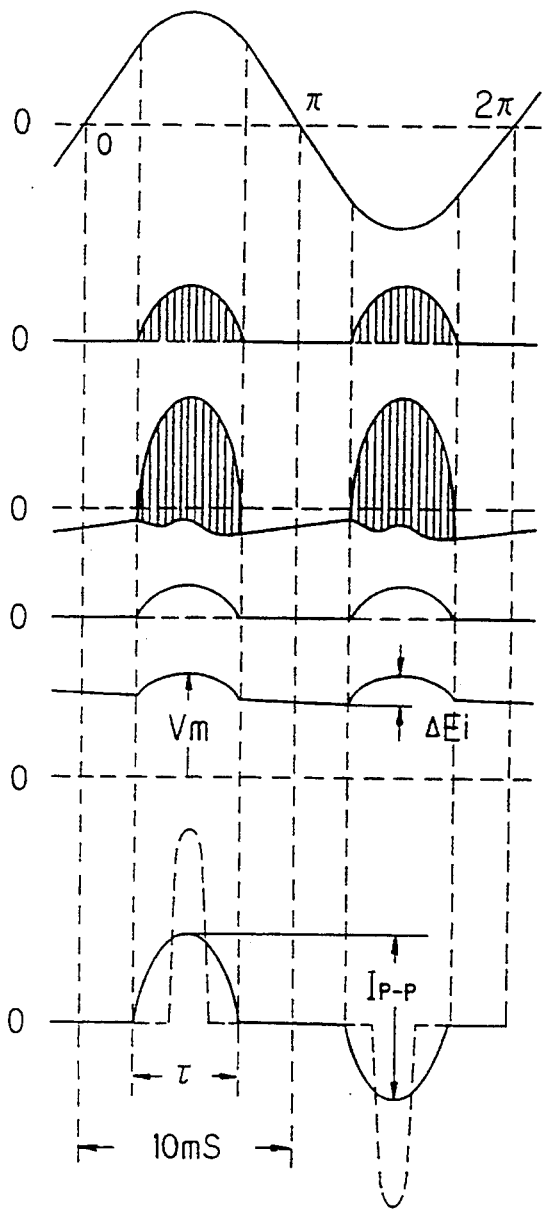

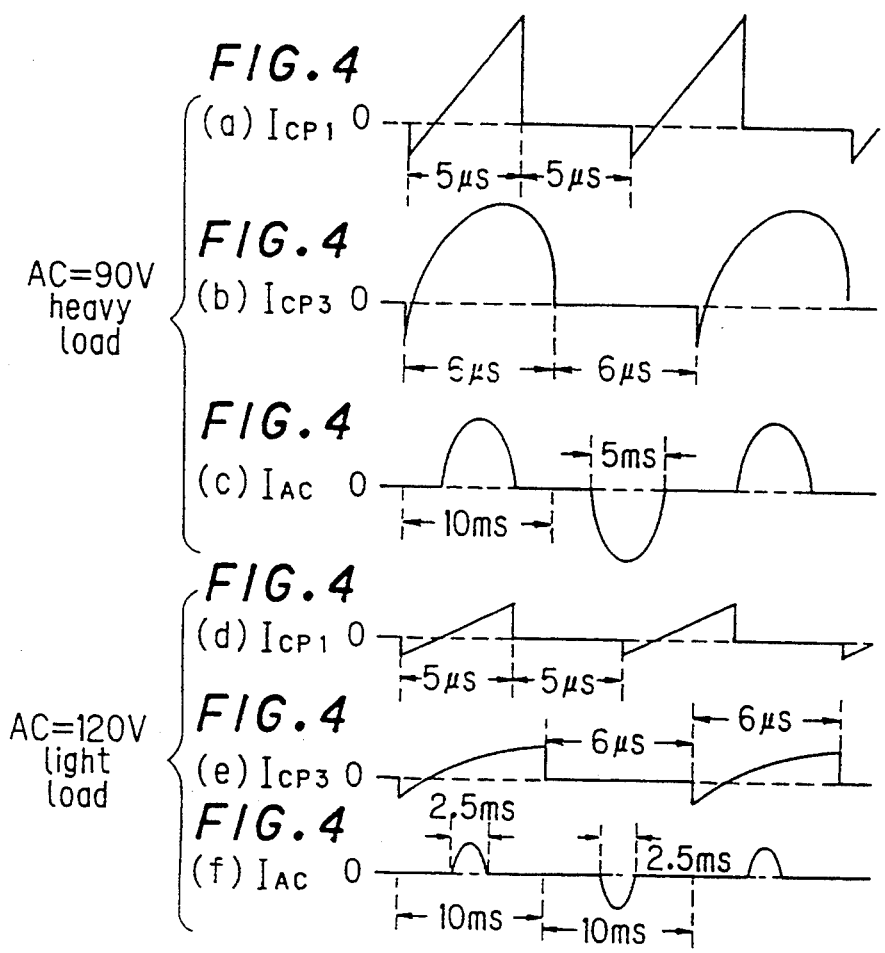

FIG. 6 (a) $V_{AC}$
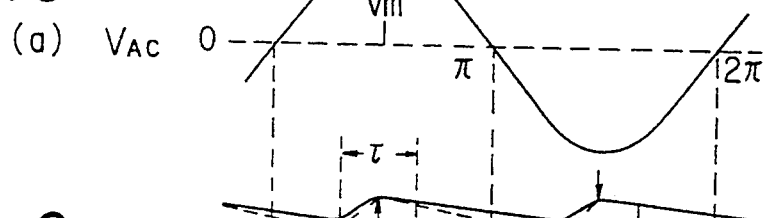
FIG. 6 (b) $E_i$
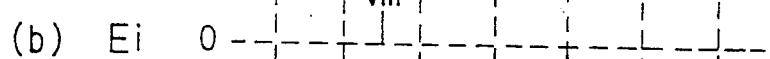
FIG. 6 (c) $I_1$
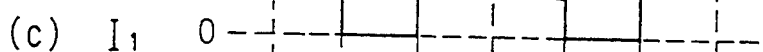
FIG. 6 (d) $V_3$
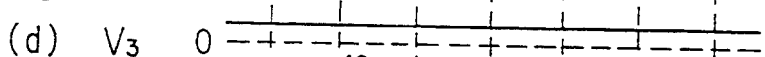
FIG. 6 (e) $I_{AC}$
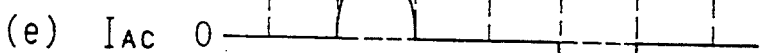

FIG.8 (a) V_AC
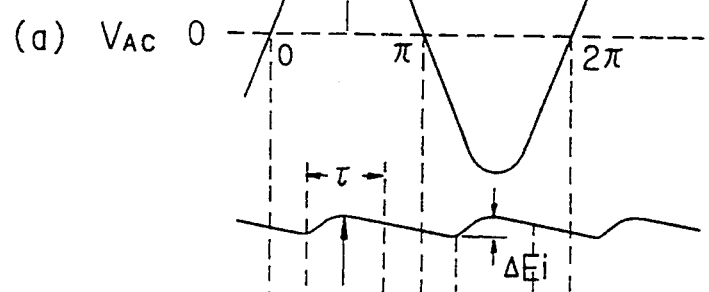
FIG.8 (b) E_i
FIG.8
FIG.8(c) I_1
FIG.8(d) V_3
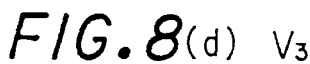
FIG.8 (e) I_CP1
FIG.8 (f) I_AC
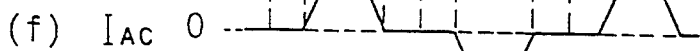

FIG.20 (a)  $I_{CP1}$
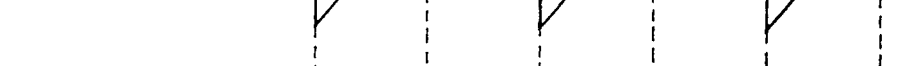
FIG.20 (b)  $I_{CP5}$
FIG.20 (c)  $V_{CP5}$

FIG.23 (a) $V_{CP3}$
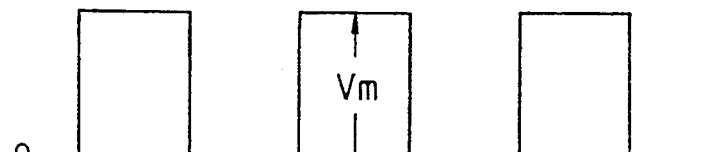
FIG.23 (b) $I_{CP2}$
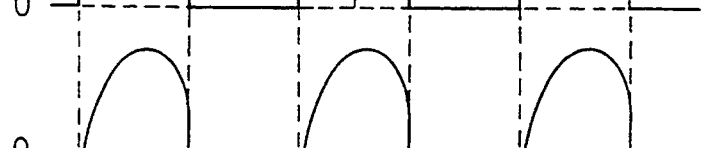
FIG.23 (c) $I_{CP31}$
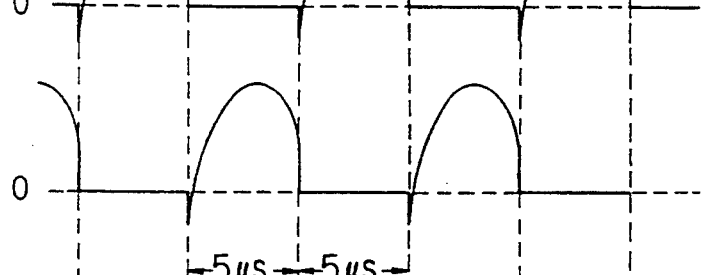
FIG.23 (d) $I_{CPD}$
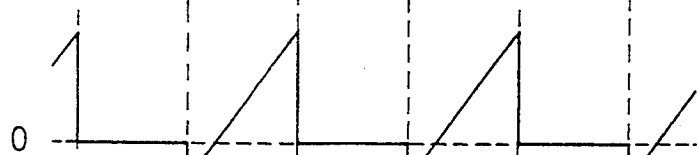
FIG.23 (e) $V_{CPD}$
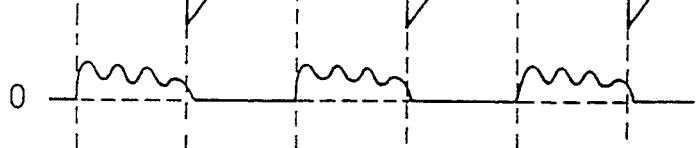
FIG.23 (f) $I_{CP3}$
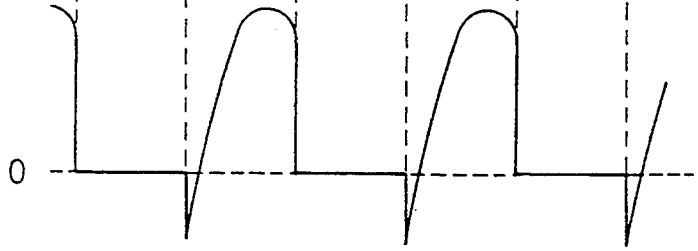

FIG.24 (a) $V_{AC}$
FIG.24 (b) $I_{AC}$
FIG.24 (c) $E_i$
FIG.24 (d) $V_1$
FIG.24 (e) $I_{31}$
FIG.24 (f) $V_{CP3}$
FIG.24 (g) $I_{CP3}$
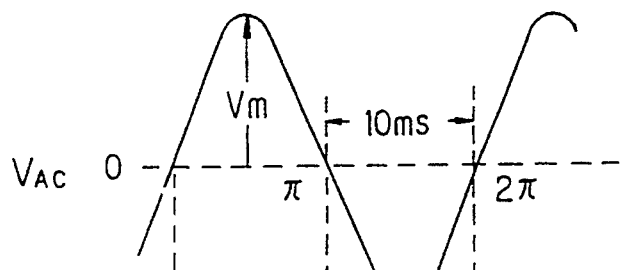
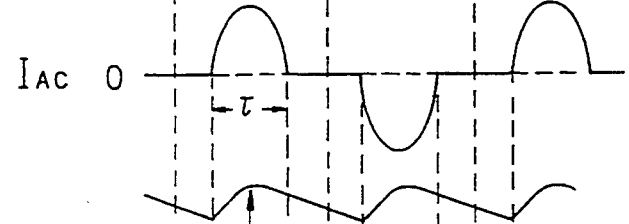
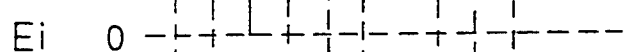
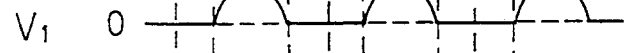
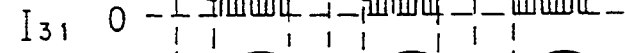
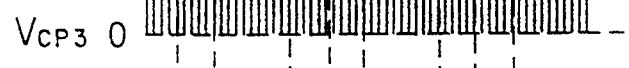

FIG.29 (a) $I_{CPD}$
FIG.29 (b) $I_{CP41}$
FIG.29 (c) $I_{CP4}$

FIG. 31 (a) $I_{CPD}$
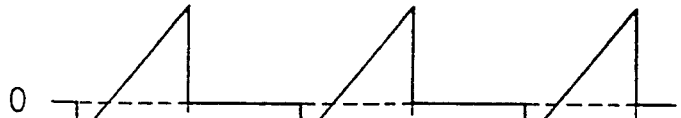
FIG. 31 (b) $I_{CP51}$
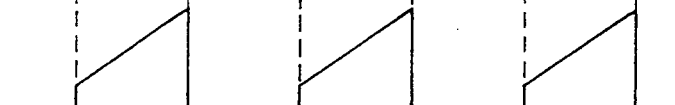
FIG. 31 (c) $I_{CP5}$

FIG.33 (a) $I_{CPD}$
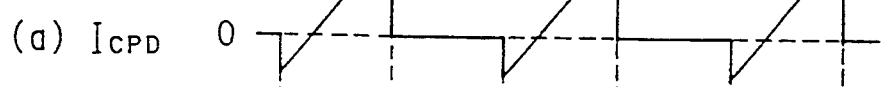
FIG.33 (b) $I_{CP51}$
FIG.33 (c) $I_{CP5}$
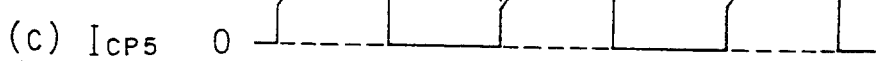

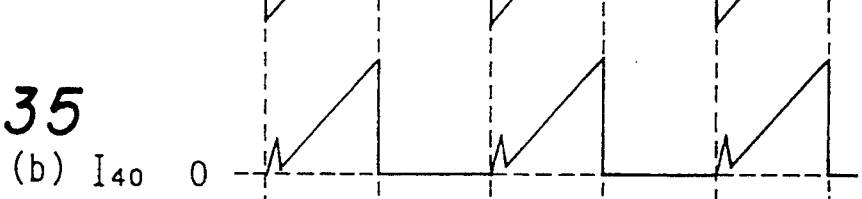
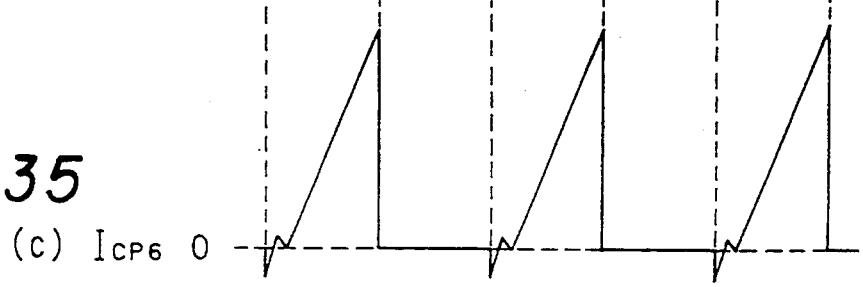

FIG.37 (a) $V_{CP42}$
FIG.37 (b) $I_{CP41}$
FIG.37 (c) $I_{CPDA}$
FIG.37 (d) $I_{CP42}$
FIG.37 (e) $I_{CPDB}$
FIG.37 (f) $I_{CP44}$
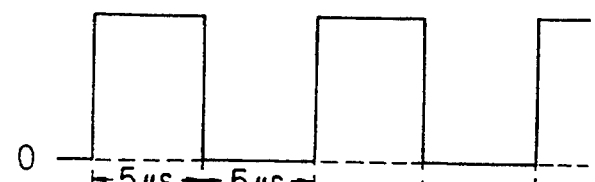
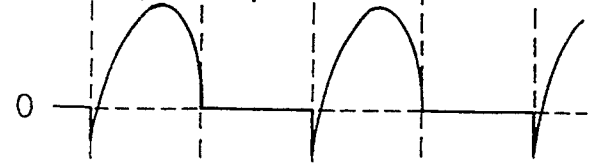
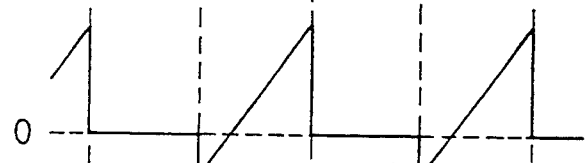
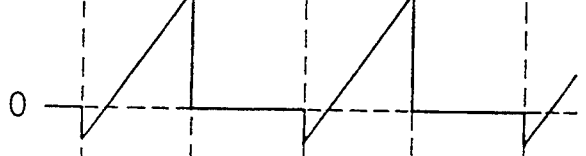
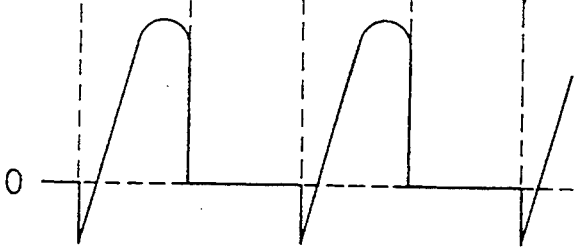

SWITCHING POWER SOURCE APPARATUS

BACKGROUND OF THE INVENTION

1. Field of the Invention

The present invention relates to a switching power supply apparatus and, in particular, to such apparatus which operates with a relatively high efficiency.

2. Description of the Prior Art

In the prior art, high frequency distortion of power signals obtained from commercial a.c. power supplies occurs in visual equipment, such as, color televisions, television projectors and monitor equipment; video equipment, such as, video tape recorders and video disc players; audio equipment; office automation equipment and so forth. As a result, the so-called power efficiency of signals obtained from such a.c. power supplies is reduced or minimized.

In an attempt to improve the power efficiency, power choke coil inductors may be inserted in the a.c. line, or rectangular-wave shape converter circuits or active filter circuits employing oscillating wave shape converters may be utilized. However, these techniques are relatively expensive. Further, power choke coil inductors are relatively heavy and may cause problems due to magnetic flux leakage. Furthermore, the use of active filter circuits may also present problems relating to high electro-magnetic interference (EMI), power loss and the need of a relatively large area on a board, and so forth.

A partial rectification smoothing circuit having a voltage resonance converter circuit was therefore developed which can reduce high frequency distortion in signals obtained from a commercial a.c. power supply or the like, and provide power signals with a relatively high efficiency. Such circuit also produces relatively low EMI levels, and has a relatively small size, low weight and low cost.

FIG. 1 illustrates a circuit 100 which is an example of a switching power supply apparatus having a voltage resonance converter circuit. As shown therein, such circuit 100 generally includes an input circuit 101, a full wave rectification circuit 5, a partial rectification smoothing circuit 102 and a switching power supply circuit 12.

The input circuit 101 is coupled to the full wave rectification circuit 5 and generally includes a commercial a.c. power supply 1, a line filter transformer 4 and a capacitor C5. More specifically, line 2 is connected between one terminal of the power supply 1 and one input terminal of the rectification circuit 5 by way of winding 4a of the line filter transformer 4. Similarly, line 3 is connected between the other terminal of the power supply 1 and another input terminal of the rectification circuit 5 by way of winding 4b of the line filter transformer 4. The capacitor C5 is connected across lines 2 and 3 between the line filter transformer 4 and the full wave rectification circuit 5. The capacitor C5 and the line filter transformer 4 form a low-pass filter. The input circuit 101 is adapted to produce alternating voltage signals and to supply such signals to the full wave rectification circuit 5.

The full wave rectification circuit 5 is adapted to rectify the alternating voltage signals received from the input circuit 101 and to produce therefrom direct current pulsating voltage signals. The full wave rectification circuit 5 is formed of four diodes Da, Db, Dc and Dd which are connected together in a bridge-like manner. An output terminal on the negative side of the full rectification circuit 5 is connected to ground. An output terminal on the positive side of the full wave rectification circuit 5 is connected by way of a line 6 to a capacitor Ci and from there through a capacitor C1 to ground.

The partial rectification smoothing circuit 102 is connected to the line 6 and is adapted to smooth the d.c. pulse voltage signals supplied from the rectification circuit 5. Such circuit 102 includes the smoothing capacitor Ci and a voltage resonance converter 7. The voltage resonance converter 7 includes a converter transformer CT having a primary winding Nc1, a secondary winding Nc2 and another winding Ncb; a switching transistor Q1; and a resonance capacitor Cr which is connected in parallel across the collector and emitter of the switching transistor Q1. As a result, when the switching transistor Q1 is off, a parallel resonance voltage Vcp1 is generated by the capacitor Cr and the inductance of the primary winding Nc1 of the converter transformer CT. On the other hand, when the switching transistor Q1 is on, the collector current Icp1 is determined by the inductance of the primary winding Nc1 of the converter transformer CT, the input voltage V1, and the on time of transistor Q1.

A switching signal is generated by a first resonance circuit formed of a fixed time constant capacitor CB, the winding Ncb, and a fixed time constant inductor Lb. The fixed time constant capacitor Cb, the winding Ncb and the fixed time constant inductor Lb are connected in series. The generated switching signal is supplied from the first resonance circuit to the base of the switching transistor Q1 so as to control the switching thereof.

The voltage resonance converter 7 further includes a diode D1, a base clamping diode D2 and a film capacitor C1. When the oscillating voltage Vcp1 and the collector current Icp1 change due to the on/off operation of the switching transistor Q1 as illustrated in FIGS. 2(a) and 2(b), respectively, the wave pulse voltage V2 (FIG. 2(c)) generated in the secondary winding Nc2 of the converter transformer CT is applied to the smoothing capacitor Ci by way of the diode D1, and the charge in the smoothing capacitor Ci is repeated by a current I2. See FIGS. 2c and 2d for a representation or voltage V2 and current I2, respectively. When the switching transistor Q1 is not switching, i.e. while the a.c. voltage Vac is low, the base clamping diode D2 functions as a discharge diode.

FIG. 3 illustrates operating wave forms for signals obtained from commercial a.c. power supplies having a frequency of 50 to 60 Hz. The operation illustrated in FIG. 2 is shown in FIG. 3 as the operation within the period t.

The switching transistor Q1 only switches and the voltage resonance converter circuit 7 of the partial rectification smoothing circuit 102 operates as described above, during the period t when the a.c. voltage Vac is relatively high. Furthermore, during this period t, the smoothing capacitor Ci is charged by the a.c. voltage Vac and the voltage V2. Outside this period t, the switching operation of the switching transistor Q1 for the voltage resonance converter 7 is stopped. During this stopped period, the current flows in the direction from the diode D2 to the base of the switching transistor Q1, to the collector of the switching transistor Q1, to the primary winding Nc1 of the converter transformer CT and to the smoothing capacitor Ci, whereupon the capacitor Ci is charged. The charge stored in the capacitor Ci may thereafter be discharged on line 6 as the load current I0.

As a result of the above-described operation of the partial rectification smoothing circuit 102, a direct current (d.c.) rectification smoothed voltage Ei is produced on line 6 from the direct current (d.c.) pulsating voltage received from the full wave rectification circuit 5. However, a ripple voltage component $\Delta Ei$ is superposed on this d.c. rectification smoothed voltage Ei on line 6 as shown in FIG. 3(e). As a result, the angle of conduction of the peak current of the a.c. input current Iac, which corresponds to the smoothed d.c. voltage Ei and which is shown in FIG. 3(f) in dotted lines, is expanded. Such current Iac is supplied from the power supply 1 and, as a result, the efficiency of this power supply circuit is improved.

Thus, the partial rectification smoothing circuit 102, which includes the voltage resonance converter 7, operates so as to improve the power efficiency. The switching transistor Q1, which performs the switching operations in the voltage resonance converter so as to control the power efficiency improvement thereof, will hereinafter also be referred to as a resonance switch.

The smoothed d.c. voltage Ei from the partial rectification smoothing circuit 102 is supplied to the last stage of the switching power supply circuit 12. The switching power supply circuit 12 includes a resonance converter circuit (RCC) 9 having switching transistors Q2 and Q3, diodes D3 and D4 which act as base clamping diodes, resistors R2, R3, Rb1 and Rb2, inductors Lb1 and Lb2, and capacitors Cb1 and Cb2.

The windings Lb1 and Lb2 are part of a converter driven transformer (CDT) 10. The winding Lb1 of the converter drive transformer CDT 10, the dumping resistor Rb1 and the time constant capacitor Cb1 are connected in series and coupled to the base of the switching transistor Q2. The winding Lb1 and the time constant capacitor Cb1 constitute a first self resonating circuit. As a result, a first oscillating frequency signal is generated by the first self resonating circuit and supplied to the base of the switching transistor Q2, so as to cause the switching transistor Q2 to operate accordingly.

Similarly, the winding Lb2 of the converter driven transformer CDT 10, the resistor Rb2 and the capacitor Cb2 are connected in series and coupled to the base of the switching transistor Q3. The winding Lb2 and the capacitor Cb2 constitute a second self resonating circuit, which generates a second oscillating frequency signal which is supplied to the base of the switching transistor Q3, so as to cause the switching transistor Q3 to operate accordingly.

The switching transistors Q2 and Q3 perform switching operations in reverse phase to each other.

The switching power supply circuit 12 further includes the CDT 10, a power regulating transformer (PRT) 11, a capacitor C2 and a control circuit 8. In addition to the windings Lb1 and Lb2, the CDT 10 further includes a winding Lb0, which is coupled to the PRT 11. The PRT 11 includes a winding N1, which is coupled to the winding Lb0 of the CDT 10, and windings N2 and Nc.

When the switching transistor Q2 is turned on, and the switching transistor Q3 is turned off, current flows through the collector and emitter of the switching transistor Q2, to the winding Lb0 of the CDT 10, and then to the winding N1 of the PRT 11, so as to charge the capacitor C2. On the other hand, when the switching transistor Q2 is off, and the switching transistor Q3 is on, current flows from the capacitor C2 through the winding N1 of the PRT 11, the winding Lb0 of the CDT 10, and across the collector and emitter of the switching transistor Q3.

FIGS. 2(e), 2(f) and 2(g) respectively illustrate the voltage Vcp3, which is at the collector of the switching transistor Q3, and the currents Icp2 and Icp3, which respectively flow through the switching transistors Q2 and Q3.

Accordingly, by having the switching transistors Q2 and Q3 turn on reciprocally as previously described, an a.c. current is induced at the second winding N2 of the PRT 11. Such current is rectified and smoothed by a rectifying smoothing circuit having diodes D5, D6 and D7, which are coupled to the winding N2, and smoothing capacitors C0 and C3. This rectified and smoothed current may be extracted as a d.c. voltage E0.

The control circuit 8, which is a control error amplifier, includes a zener diode D8 and a transistor Q4. Such control circuit 8 receives the voltage generated in the winding N2 of the PRT 11 by way of resistors R4 and R5 and causes a d.c. control current to flow through the control winding Nc of the PRT 11 due to the zener diode D8 and transistor Q4. As a result, the PRT 11 provides a fixed voltage output.

The individual circuit components without reference designations depicted in FIG. 1 are connected as shown and will not be discussed further, since the connections, values and descriptions thereof are apparent to those skilled in the art and are not necessary for an understanding of the present invention.

In this type of switching power supply apparatus, there are various problems as described below.

First, in the case described above where a partial rectification and smoothing circuit 102 and a switching power supply circuit section 12 are combined, the power efficiency is improved from approximately 0.6 to 0.8 as compared to an apparatus in which a partial rectification smoothing section is not provided. Further, in such apparatus, the high frequency current is reduced. However, as previously described, a ripple voltage $\Delta Ei$ is included in the d.c. input voltage Ei for the switching power supply circuit 12. The absolute value of such $\Delta Ei$ may be two or three times higher if the partial rectification and smoothing circuit is not provided. The minimum input voltage Ei(min) is $Ei(min) = Vm - \Delta Ei$ (see FIG. 3(e)). To maintain the lower limit of the regulation scope, the number of turns on the winding N1 of the PRT 11 should be reduced and the storage capacity of the resonance capacitor C2 should be increased.

In other words, in such apparatus, since the ripple component $\Delta Ei$ is large, it may be necessary to provide a circuit for increasing the amount of control sensitivity of the control circuit 8 on the switching power supply circuit section 12 to improve the ripple suppression rate so as to reduce the ripple component of the d.c. output voltage E0 or, alternately, it may be necessary to increase the capacitance of the capacitor C0 or so forth. Further, to maintain the lower limit regulation scope setting, a redesign of the switching power supply circuit 12 may be necessary.

Second, problems may occur from having the switching frequency of the switching power supply circuit 12 and that of the partial rectification smoothing circuit 102 operate independently from each other. For example, the frequency of the signals generated by the first and second self resonant circuits of the switching power supply circuit 12 (i.e., the windings Lb1, Lb2 of the CDT 10 and the fixed time constant capacitors Cb1, Cb2) may be 100 kHz. Whereas, the frequency of the signal generated by the resonance circuit 7 in the partial rectification smoothing circuit 102 (i.e., by the winding Ncb, the fixed time constant inductor Lb, and the fixed time constant capacitor Cb)may be 83.3 kHz. Differences in such switching operation wave forms may be readily apparent by comparing FIGS. 2(a), 2(b) and 2(e), 2(f), 2(g).

As a result, since a resonating circuit is required for both the switching power supply circuit 12 and the partial rectification smoothing circuit 102 (in particular, the voltage resonance converter 7), the number of parts, the amount of substrate surface area and the cost are relatively high. Further, such duplication of resonating circuits increases the difficultly in miniaturizing the circuit. Furthermore, since the switching frequencies are different, the switching power supply circuit and/or the voltage resonance converter may oscillate abnormally due to stray magnetic flux or crosstalk caused, for example, by EMI generated by the reactive elements (inductances, choke coils, transformers and so forth). As a result, the capacitances of the capacitors C1 and C0 may have to be relatively large, or shielding may have to be installed between the elements.

Third, as previously described, the switching frequency of the voltage resonance converter of the partial rectification smoothing circuit is determined by the resonating circuit having the fixed time constant capacitor Cb, and the combined inductance of the winding Ncb and the fixed time constant inductor Lb. As a result, the power efficiency will decrease due to a rise in the a.c. input voltage and a fall in the load current. For example, consider FIGS. 4(a) to 4(f). As shown therein, FIGS. 4(a) to 4(c) and 4(d) to 4(f) respectively illustrate the collector current Icp1 for the switching transistor Q1, the collector current Icp3 for the switching transistor Q3, and the a.c. input current Iac when the switching frequency for voltage resonance converter 7 is 100 kHz and the switching frequency for the switching power supply circuit 12 is 83.3 kHz. However, the wave forms shown in FIGS. 4(a) to 4(c) correspond to a relatively heavy load and an a.c. voltage of 90 V, whereas those shown in FIGS. 4(d) to 4(f) correspond to a relatively light load and an a.c. voltage of 120 V.

As shown in FIG. 4, the switching frequency of the voltage resonance converter 7 of the partial rectification smoothing circuit 102 does not depend on the a.c. input voltage and the current load. That is, in these situations, the switching frequency remains approximately constant. Further, even if the power efficiency is 0.85 when there is a heavy load, the power efficiency drops to 0.6 for light loads due to the narrowing of the conduction angle for the current Iac.

The above-described problems or disadvantages do not only occur when the switching power supply circuit 12 employs a current resonance converter which operates in accordance with a series oscillation frequency control technique and which uses a power regulating transformer, as in circuit 100 of FIG. 1. Such problems may also exist for switching power supply apparatus utilizing other types of converters and/or techniques. For example, such problems may exist for switching power supply apparatus having a current resonance converter which operates in accordance with a switching frequency control technique and uses a power regulating transformer, a voltage resonance converter which operates in accordance with a magnetic flux control technique and uses a power regulating transformer, a flyback converter which operates in accordance with a pulse width modulation (PWM) control technique, a forward converter which operates in accordance with a PWM control technique, a ringing choke converter which operates in accordance with a switching frequency control technique, or the like.

Thus, the prior art has failed to provide a switching power supply apparatus in which ripple components are reduced and in which the aforementioned problems associated with separate resonant circuits in the partial rectification smoothing circuit and the switching power supply circuit of the apparatus are eliminated or minimized.

OBJECTS AND SUMMARY OF THE INVENTION

An object of the present invention is to provide a switching power supply apparatus which overcomes the problems associated with the prior art.

More specifically, it is an object of the present invention to provide a switching power supply apparatus, having a partial rectification smoothing circuit and a switching power supply circuit, with a circuit for extracting a low voltage signal from the switching power supply circuit and for utilizing such extracted low voltage signal to reduce the ripple component present in a d.c. signal produced by the partial rectification smoothing circuit.

Another object of the present invention is to provide a switching power supply apparatus, having a partial rectification smoothing circuit and a switching power supply circuit, with a common switching signal generating circuit which generates a common switching signal for use by the partial rectification smoothing circuit and the switching power supply circuit.

A still further object of the present invention is to provide a switching power supply apparatus having a partial rectification smoothing circuit and a switching power supply circuit in which the partial rectification smoothing circuit and the switching power supply circuit utilize a common switching device.

A further object of the present invention is to provide a switching power supply apparatus in which the number of components and the amount of surface area for such components is reduced or minimized so as to enable the apparatus to have a relatively small size.

Yet another object of the present invention is to provide a switching power supply apparatus which may be fabricated for a relatively low cost.

In accordance with an aspect of the present invention, a switching power source apparatus for receiving alternating voltage signals from an AC input power source and for producing a power signal with a relatively high efficiency is provided. The apparatus includes a rectifying circuit for rectifying the received alternating voltage signals so as to produce a direct current pulsating voltage signal and a circuit for smoothing the direct current pulsating voltage signal so as to produce a smoothed direct current signal. The smoothed direct current signal includes a ripple current component. The apparatus further including a switching power supply circuit for producing the power signal with relatively high efficiency; an extracting circuit for extracting a low voltage signal from the switching power supply circuit; and a circuit for superposing the extracted low voltage signal on the smoothed direct current signal so as to reduce the ripple current component of the smoothed direct current signal and for supplying the smoothed direct current signal having a reduced ripple current component to the switching power supply circuit, whereupon the switching power supply circuit produces the power signal.

In accordance with another aspect of the present invention, a switching power source apparatus for receiving alternating voltage signals from an AC input power source and for producing a power signal is provided. The ,apparatus includes a rectifying circuit for rectifying the received alternating voltage signals so as to produce a direct current pulsating voltage signal and a smoothing circuit for smoothing the direct current pulsating voltage so as to produce a smoothed direct current signal. The smoothing circuit includes a rectification smoothing circuit having a transformer and first switching device coupled to the transformer for controlling the flow of signals through the smoothing circuit in response to a common oscillation signal. The apparatus further includes a switching power supply circuit for receiving the smoothed direct current signal and for producing the power signal therefrom. The power supply circuit includes a second switching device responsive to the common oscillation signal for controlling the flow of signals through the switching power supply circuit. The apparatus still further includes a common oscillation device for generating the common oscillation signal and for supplying the generated common oscillation signal to the first and second switching devices.

In accordance with a still further aspect of the present invention, a switching power source apparatus for receiving alternating voltage signals from an AC input power source and for producing a power signal is provided. The apparatus includes a rectifying circuit for rectifying the received alternating voltage signals so as to produce a direct current pulsating voltage signal; a circuit having a rectification smoothing circuit for smoothing the direct current pulsating voltage signal so as to produce a smoothed direct current signal; a switching power supply circuit for receiving the smoothed direct current signal and for producing the power signal therefrom; and a common switching device coupled to the smoothing circuit and the switching power supply circuit for controlling the flow of signals through the smoothing circuit and the switching power supply circuit.

Further, the present switching power supply apparatus includes a rectifying circuit, a smoothing capacitor, a voltage resonance converter and a switching power supply circuit. In such apparatus, an operating switch for the voltage resonance converter may operate in synchronization with a switching frequency or a converter circuit for the switching power supply circuit.

Furthermore, in the present switching power supply apparatus having a rectifying circuit, a smoothing capacitor, a voltage resonance converter and a switching power supply circuit, the voltage resonance converter is coupled to a switching transistor in a converter circuit of the switching power supply circuit by way of a junction diode, such that the switching transistor may also be used as a resonance switch for the voltage resonance converter.

Still further, in the present switching power supply apparatus having a rectifying circuit, a smoothing capacitor, a voltage resonance converter and a switching power supply circuit, the voltage resonance converter is coupled to a junction diode which, in turn, is connected to a switching transistor in a converter circuit for the power supply switching circuit, such that the switching frequency can be controlled so as to follow changes in the a.c. input voltage and the load.

Other objects, features and advantages according to the present invention will become apparent from the following detailed description of illustrated embodiments when read in unction with the accompanying drawings in which corresponding components are identified by the same reference numerals.

BRIEF DESCRIPTION OF THE DRAWINGS

FIGS. 2(a) to 2(g) are diagrams to which reference will be made in explaining the operation of the switching power supply apparatus of FIG. 1;

FIGS. 3(a) to 3(f) are diagrams to which reference will be made in explaining the operation of the switching power supply apparatus of FIG. 1;

FIGS. 4(a) to 4(f) are diagrams corresponding to load variations to which reference will be made in explaining the operation of the switching power supply apparatus of FIG. 1;

FIGS. 6(a) to 6(e) are diagrams to which reference will be made in explaining the apparatus of FIG. 5;

FIGS. 8(a) to 8(f) are diagrams to which reference will be made in explaining the apparatus of FIG. 7;

FIGS. 20(a), 20(b) and 20(c) are diagrams to which reference will be made in explaining the apparatus of FIG. 19;

FIGS. 23(a) to 23(f) are diagrams to which reference will be made in explaining the apparatus of FIG. 22;

FIGS. 24(a) to 24(g) are diagrams to which reference will be made in explaining the apparatus of FIG. 22;

FIGS. 31(a), 31(b) and 31(c) are diagrams to which reference will be made in explaining the apparatus of FIG. 30;

FIGS. 33(a), 33(b) and 33(c) are diagrams to which reference will be made in explaining the apparatus of FIG. 32;

FIGS. 35(a), 35(b) and 35(c) are diagrams to which reference will be made in explaining the apparatus of FIG. 34;

FIGS. 37(a) to 37(f) are diagrams to which reference will be made in explaining the apparatus of FIG. 36.

DESCRIPTION OF THE PREFERRED EMBODIMENTS

Figure 5:
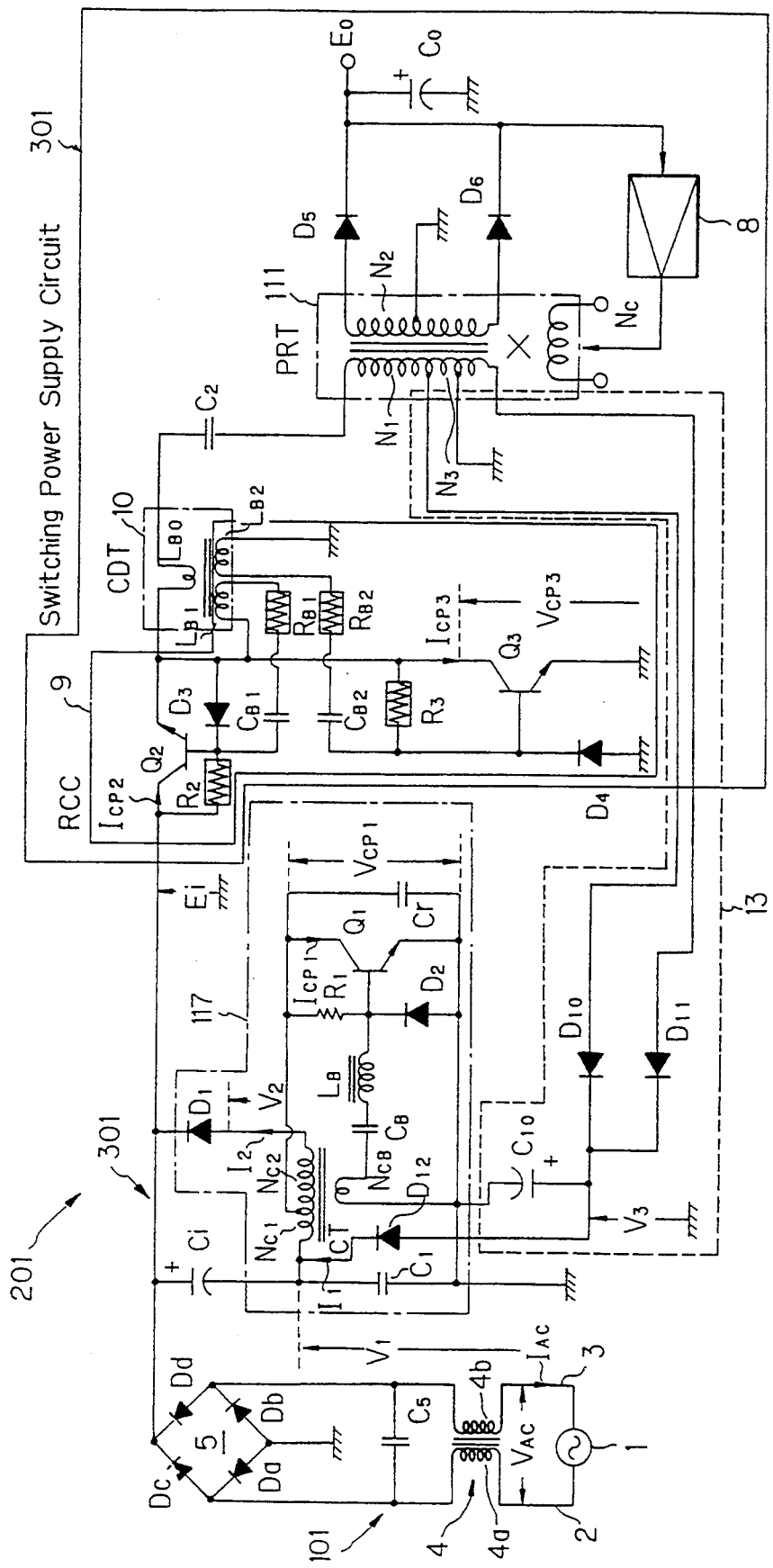
FIG. 5 is a circuit diagram of a switching power supply apparatus according to a first embodiment of the present invention, in which a power supply switching circuit section thereof includes a current resonance converter which operates in accordance with a switching frequency control technique.

A switching power supply apparatus according to a first embodiment of the present invention will now be described with reference to FIGS. 5 and 6 which respectively illustrate a circuit 201 and signal wave forms of such circuit. As shown in FIG. 5, with the exception of an addition of an extracting circuit 13 and related changes, the circuit 201 of the present switching power supply apparatus is similar to the circuit 100 of the apparatus of FIG. 1. Accordingly, only the differences between the circuit 201 of FIG. 5 and that of FIG. 1 will be described.

Further, since several of the present embodiments are similar to each other as hereinafter described, in the interest of brevity, only differences therebetween and/or relevant portions thereof will be discussed with regard to the respective embodiment. Thus, in describing a respective embodiment, an "abbreviated" description may be provided. However, as is to be appreciated, the full description of such respective embodiment includes both the respective abbreviated description and the description of the embodiment(s) to which such respective embodiment is similar.

A switching power supply circuit 301 of the circuit 201 of FIG. 5 is operated by a current resonance converter which includes the CDT 10 and a PRT 111. Such current resonance converter operates in accordance with a serial oscillation frequency control technique, such as one of those known in the art.

The extracting circuit 13 is adapted to reduce the ripple voltage component in the d.c. input voltage Ei supplied to the switching power supply circuit 301. More specifically, the extracting circuit 13 generally includes diodes D10 and D11, a low voltage output winding N3, and a smoothing capacitor C10. The PRT 111 (unlike the PRT 11 of circuit 100 which has windings N1, N2 and Nc) has windings N1, N2, Nc and a low voltage output winding N3. The winding N3 is preferably wound, with a center tap, on the same side of the PRT 111 as the primary winding N1.

The winding N3 is adapted to produce a relatively low voltage output from the PRT 111. The low voltage output is rectified by the rectifying diodes D10 and D11, which are coupled to both ends of the low voltage output winding N3. This rectified voltage is then smoothed by the smoothing capacitor C10 so as to produce a low d.c. output voltage V3, which may have a value of 15 to 20 V.

The smoothing capacitor C10 is connected to a discharge diode D12, which is included in a voltage resonance converter 117 of the partial rectification smoothing circuit 301, with one side of the discharge diode D12 being connected to the positive side of the smoothing capacitor C10. The discharge diode D12 is coupled to the smoothing capacitor Ci, as shown in FIG. 5.

In the circuit 201, the absolute value of the d.c. input voltage Ei occurs during a period t while the switching transistor Q1 is switching and when the voltage at the smoothing capacitor Ci is a maximum Vm, as shown in FIG. 6. During the period in which such switching operation has stopped, the d.c. voltage V3 (FIG. 6(d)) obtained from the winding N3 of the PRT 111 is discharged from the smoothing capacitor Ci to the switching power supply circuit section 301 by way of the discharge diode D12. (FIGS. 6(a), 6(c) and 6(e) respectively illustrate wave forms for Vac, I1 and Iac.) Thus, in other words, the d.c. voltage V3 from the winding N3 is superposed with the d.c. input voltage Ei in the period while the above-described switching operation has stopped. As a result, the ripple voltage component $\Delta Ei$ of the d.c. input voltage Ei, as illustrated by the dotted line in FIG. 6(b), can be significantly reduced. Furthermore, if the d.c. voltage V3 is made equal to $\Delta Ei$, the ripple voltage component $\Delta Ei$ will be substantially zero.

As an example of the power efficiency improvement of the circuit 201 of FIG. 5, consider the following situations.

Consider a capacitor input rectification smoothing circuit (not shown) having a surge current limiting resistance of 1 ohm connected thereto. In such circuit, when the load power has a value of 153 W, the smoothing capacitor has a value of 1000 $\mu F$ and the a.c. voltage has a value of 100 V at a frequency of 50 Hz, the power efficiency is 0.64, the mean value of the d.c. input voltage $Ei=128$ VDC and the ripple voltage component $\Delta Ei=10$ VP. This situation may be considered an improvement over that of the circuit 100 of FIG. 1, wherein although the power efficiency is 0.825 and the mean value for the d.c. input voltage Ei is 118 VDC, the ripple voltage component $\Delta Ei$ is 32 VP. On the other hand, in the circuit 201 of FIG. 5, when V3 has a value of 22 VP, the power efficiency is approximately 0.81, the mean value of the d.c. input voltage Ei is 127 VDC and the ripple voltage component $\Delta Ei$ is 10 VP.

A switching power supply apparatus according to a second embodiment of the present invention will now be described with reference to FIGS. 7 and 8 which respectively illustrate a circuit 202 and signal wave forms of such circuit. As with the first embodiment of the present invention, the second embodiment of the present invention and the subsequently described embodiments thereof include portions similar to the circuit 100 of FIG. 1 and, accordingly only the differences therebetween will be described.

Figure 7:
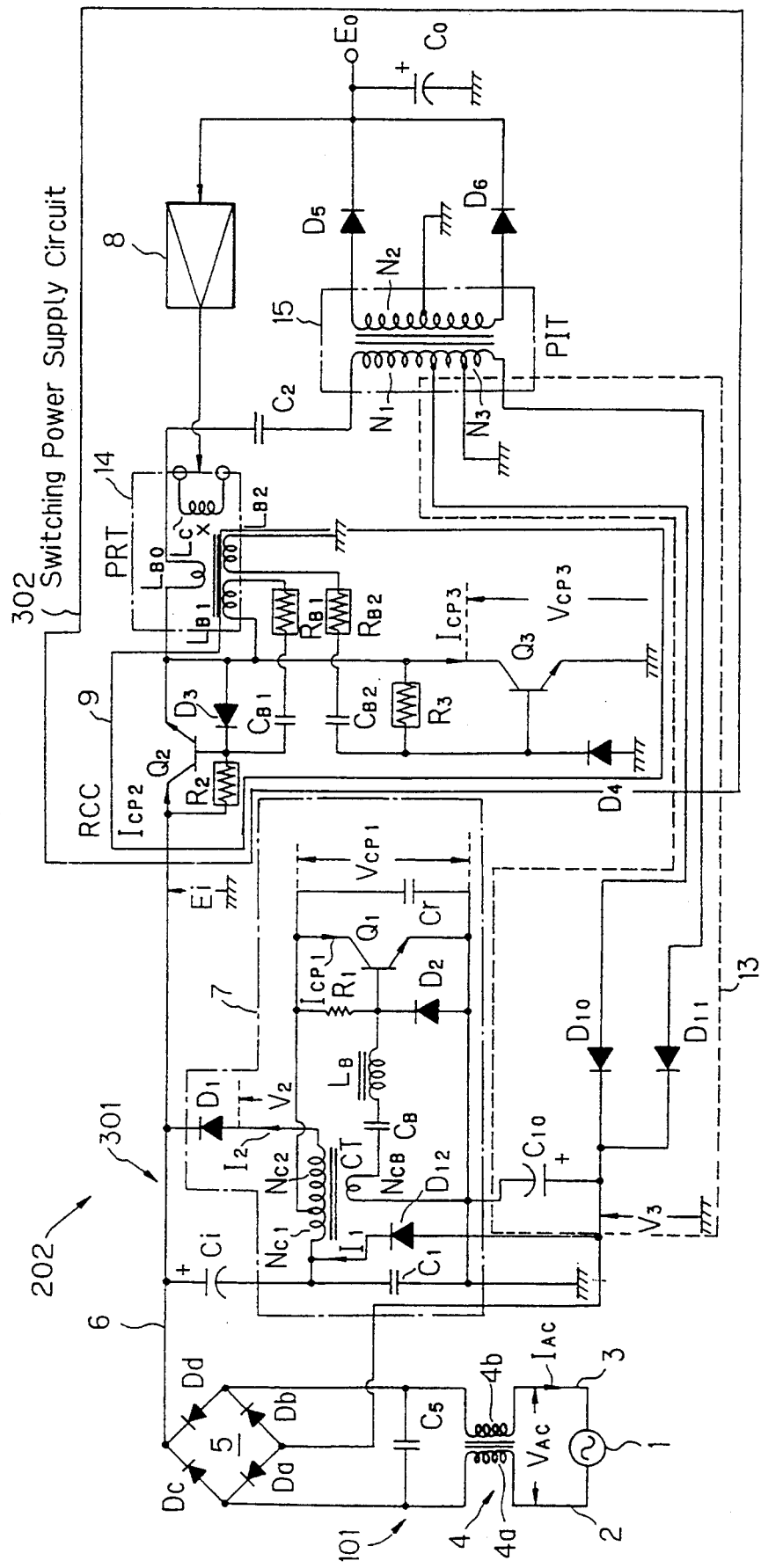
FIG. 7 is a circuit diagram of a switching power supply apparatus according to a second embodiment of the present invention, in which a power supply switching circuit section thereof includes a current resonance converter which operates in accordance with a switching frequency control technique.

A switching power supply circuit 302 of the circuit 202 of FIG. 7 is operated by a current resonance converter which includes a power regulating transformer (PRT) 14 and a power isolation transformer (PIT) 15. Such current resonance converter operates in accordance with a switching frequency control technique, such as one of those known in the art.

As with the circuit 201 of FIG. 5, the circuit 202 includes the extracting circuit 13. The extracting circuit 13 of the circuit 202, like that of circuit 201, includes diodes D10 and D11, smoothing capacitor C10 and low voltage output winding N3. However, in the circuit 202, the winding N3 is provided on the PIT 15. More specifically, the PIT 15 includes windings N1, N2 and N3, in which winding N3 is preferably wound on the same side of the PIT as winding N1.

The winding N3 of the PIT 15 is adapted to produce a relatively low voltage output. This low voltage output is rectified by the diodes D10 and D11, which are coupled to the winding N3. The rectified voltage is smoothed by the capacitor C10 so as produce a low d.c. voltage V3.

In a manner similar to that of the circuit 201 of FIG. 5, in the circuit 202, when the switching of the switching transistor Q1 stops, the voltage V3 flows to the switching power supply circuit 302 by way of the surge diode D12 and the smoothing capacitor Ci. Thus, when such switching operation stops, the voltage V3 extracted from the third winding N3 is superposed with the d.c. input voltage Ei so as to significantly reduce the ripple component $\Delta Ei$ of the d.c. input voltage Ei (see FIG. 8 for wave forms of various voltages and currents of the circuit 202).

Further, in the circuit 202, the positive electrode of the capacitor C10 is connected to a terminal on the negative side of the rectification circuit 5. As a result, the ripple voltage component $\Delta Ei$ of the d.c. input voltage Ei is reduced, as shown in FIG. 8(b), while Ei becomes equal to the quantity $Vm+V3$, thereby increasing since the voltage V3 is superposed with the maximum value Vm of the a.c. input voltage Vac. If the d.c. input voltage Ei is increased in this manner, the scope of the regulation of the lower limit of the a.c. input voltage Vac can be widened.

The voltage excited on the second winding N2 of the PIT 15 is rectified by diodes D5 and D6 and the rectified voltage is smoothed by the smoothing capacitor CO. The smoothed voltage is supplied from the circuit 202 as an output smoothed voltage Eo. The error control amplifier 8 is adapted to apply a control current to a control winding Lc of the PRT 14 based on the smoothed voltage Eo.

In the circuit 202, the PRT 14 is adapted to function as a drive transformer for the switching transistors Q2 and Q3. Accordingly, the resonating frequencies of the first self resonating circuit having the winding Lb1 of the PRT 14 and the fixed time constant capacitor Cb1, and second self resonating circuit having the winding Lb2 of the PRT 14 and the time constant capacitor Cb2 are controlled.

Figure 9:
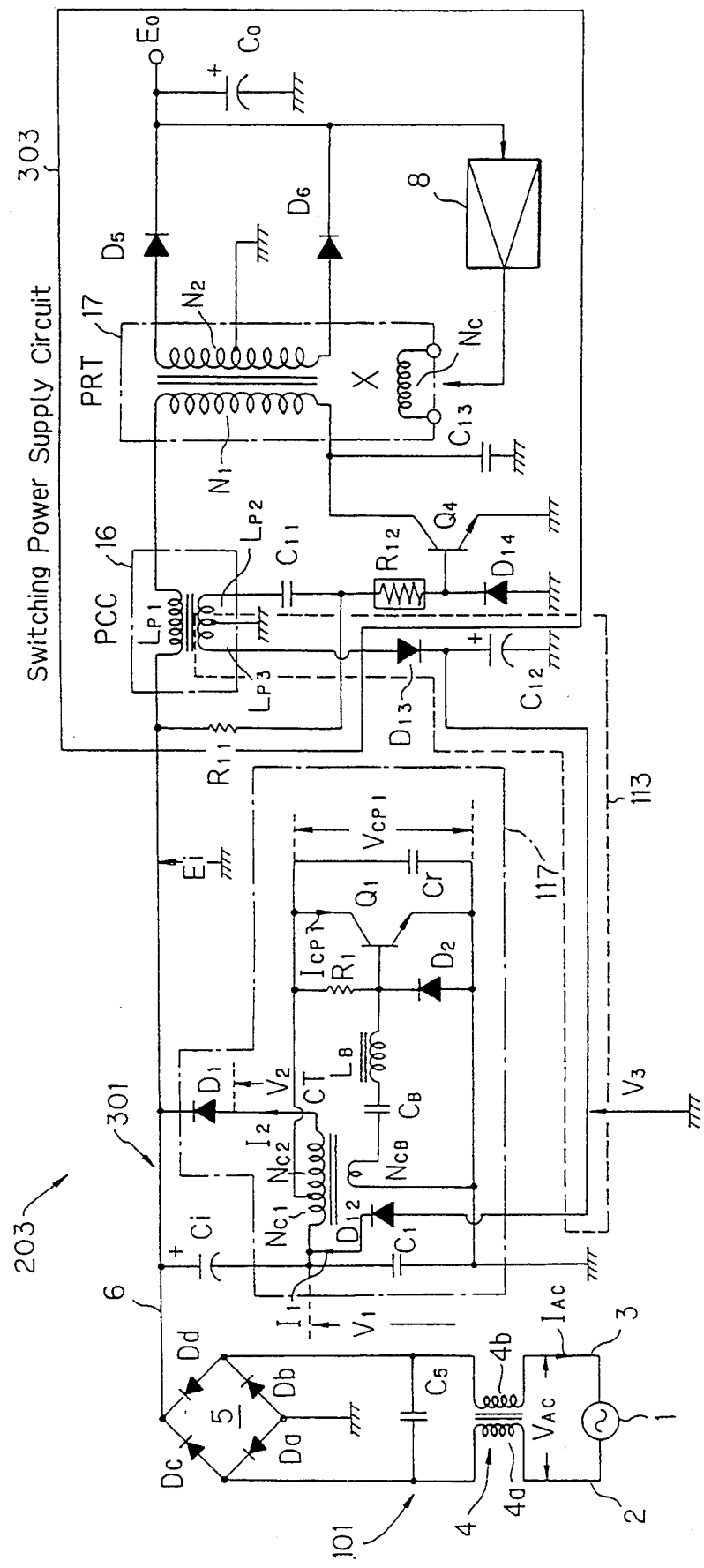
FIG. 9 is a circuit diagram of a switching power supply apparatus according to a third embodiment of the present invention, in which a power supply switching circuit section thereof includes a voltage resonance converter which operates in accordance with a magnetic flux control technique.

A switching power supply apparatus according to a third embodiment will now be described with reference to FIG. 9, which illustrates a circuit 203 of such apparatus. The circuit 203 includes a switching power supply circuit 303 which, in turn, includes a voltage oscillation shape converter having a single core power regulating transformer (PRT) 17 and a power choking coil (PCC) 16. This voltage oscillation shape converter operates in accordance with a magnetic flux control technique, such as one of those known in the art.

The circuit 203 includes an extracting circuit 113, which is somewhat different than that of circuits 201 and 202. That is, the extracting circuit 113 includes a diode D13, a smoothing capacitor C12 and a low voltage winding Lp3. Such winding Lp3 is provided on the PCC 16. More specifically, the PCC 16 includes windings Lp1, Lp2 and Lp3, in which winding Lp3 is preferably wound on the same side of the PCC as winding Lp2.

The winding Lp3 of the PCC 16 is adapted to produce a relatively low voltage output. This low voltage output is rectified by the diode D13, which is coupled to the winding Lp3. The rectified voltage is smoothed by the capacitor C12 so as produce a low d.c. voltage V3.

The voltage V3 flows to the switching power supply circuit 303 by way of the discharge diode D12 and the smoothing capacitor Ci while the switching transistor Q1 is stopped, as with circuit 201, so that the ripple voltage component of the d.c. input voltage Ei is reduced in the same manner. (The wave forms illustrated in FIG. 6 may be referred to herein.)

Further, the switching power supply circuit 303 includes an oscillation capacitor C13 which is coupled to the switching transistor Q4. An a.c. voltage is derived from a second winding N2 of the PRT 17 in accordance with an oscillating voltage obtained from a first winding N1 of the PRT and the resonance capacitor C13. Such a.c. voltage is rectified by diodes D5 and D6 and smoothed by the capacitor Co so as to produce a smoothed d.c. voltage Eo.

Furthermore, a series connection of a fixed time constant capacitor C11, a resistor R12 and the secondary winding Lp2 of the PCC 16, which functions as a driven transformer, is coupled to the base of a transistor Q4 included in the switching power supply circuit 303. As a result, an oscillation frequency may be applied to the base of the switching transistor Q4 so as to enable the switching transistor Q4 to be switched.

The switching power supply circuit 303 further includes a base clamp diode D14 and a resistor R11, which is adapted limit peaks which may occur during start-up (hereinafter referred to as a "starting resistor").

Figure 10:
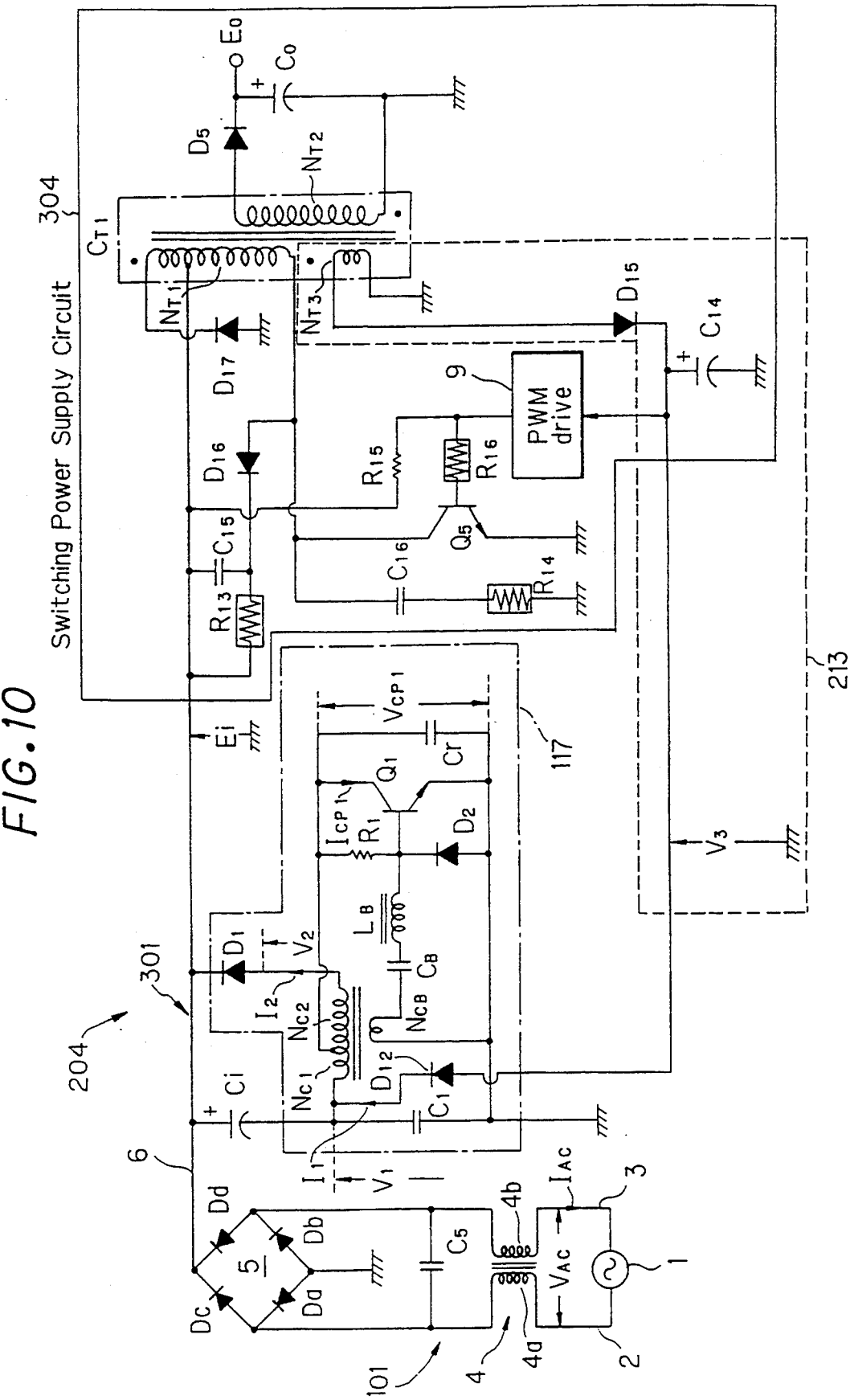
FIG. 10 is a circuit diagram of a switching power supply apparatus according to a fourth embodiment of the present invention, in which a power supply switching circuit section thereof includes a flyback converter which operates in accordance with a pulse width modulation (PWM) control technique.

A switching power supply apparatus according to a fourth embodiment of the present invention will now be described with reference to FIG. 10, which illustrates a circuit 204 of such apparatus. The circuit 204 includes a switching power supply circuit 304 which, in turn, includes a rectangular wave-type converter having a converter transformer (CT) 1. This rectangular wave-type converter, which may be a flyback converter, operates in accordance with a single core pulse width modulation (PWM) technique, such as one of those known in the art.

The circuit 204 includes an extracting circuit 213, which includes a diode D15, a smoothing capacitor C14 and a low voltage winding Nt3. Such winding Nt3 is provided on the CT1. More specifically, the CT1 includes windings Nt1, Nt2 and Nt3, in which winding Nt3 is preferably wound on the same side of the CT1 as winding Nt1. The dots(.) appearing on the CT1, and any other subsequently described components, indicate polarization, such as the positive side of such component.

The winding Nt3 of the CT1 is adapted to produce a relatively low voltage output. This low voltage output is rectified by the diode D15, which is coupled to the winding Nt3. The rectified voltage is smoothed by the capacitor C14 so as produce a low d.c. smoothed voltage V3.

The switching power supply circuit 304 further includes a PWM drive circuit 9, which is coupled to the base of a switching transistor Q5 by way of a resistor R16 and is adapted to supply a switching control signal to such transistor Q5 in accordance with the d.c. voltage V3. A starting resistor R15 is also coupled to the PWM drive circuit 9.

When the switching transistor Q5 is turned on by the PWM drive circuit 9, current from the winding Nt1 of the converter transformer CT1 flows between the collector and emitter of the switching transistor Q5, and electromagnetic energy is stored in the winding N1. If the switching transistor Q5 is then turned off, an a.c. voltage is generated at the winding Nt2 due to the dissipation of the electromagnetic energy stored in the winding N1. This voltage passes through a diode D5 and the smoothing capacitor CO so as to produce a d.c. smoothed voltage Eo, in a manner similar to that previously described with regard to the other embodiments.

The switching power supply circuit 304 still further includes a noise suppression circuit, a protection circuit and a diode D17. The noise suppression circuit includes a diode D16, a capacitor C15 and a resistor R13 which are positioned in a path the current may take when the switching transistor Q5 is turned off. The protection circuit, which includes a capacitor C16 and a resistor R14, is adapted to protect the switching transistor Q5 against relatively high current or voltage levels which, for example, may occur during initialization. The diode D17 functions as a reset diode so as to allow the electromagnetic energy of the winding NT1 to flow away when the switching transistor Q5 is off.

While the switching transistor Q1 in the voltage resonance converter 117 is stopped, the d.c. voltage (V3) flows to the switching power supply circuit 304 by way of the discharge diode D12 and the smoothing capacitor Ci, as in the circuit 201 of FIG. 5. As a result, the ripple voltage component of the d.c. input voltage Ei is similarly reduced. (The wave forms illustrated in FIG. 6 may be referred to herein.)

Figure 11:
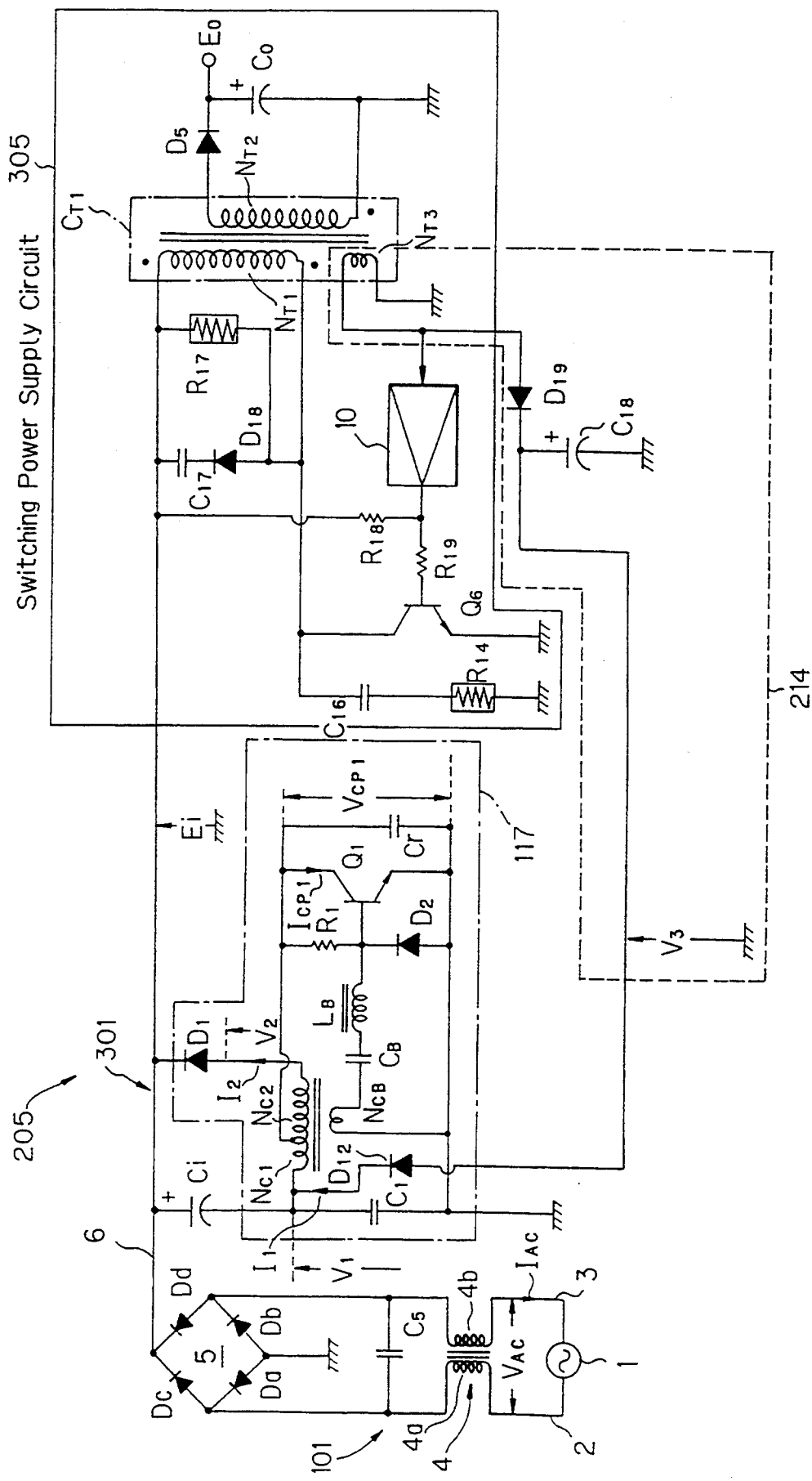
FIG. 11 is a circuit diagram of a switching power supply apparatus according to a fifth embodiment of the present invention, in which a power supply switching circuit section thereof includes a ringing choke converter which operates in accordance with a switching frequency control technique.

A switching power supply apparatus according to a fifth embodiment of the present invention will now be described with reference to FIG. 11, which illustrates a circuit 205 of such apparatus. The circuit 205 includes a switching power supply circuit 305 which, in turn, includes a rectangular wave-type converter having a converter transformer (CT) 1. This rectangular wave-type converter, which may be a ringing choke converter, operates in accordance with a single core switching frequency control technique, such as one of those known in the art.

The circuit 205 includes an extracting circuit 214, which includes a diode D19, a smoothing capacitor C18 and a low voltage winding Nt3. As with the circuit 204 of FIG. 10, the winding Nt3 of circuit 205 is provided on the CT1 and preferably on the same side as winding Nt1. Further, in a manner similar to that of circuit 204, the winding Nt3 produces a low voltage output which is rectified by the diode D19 and smoothed by the capacitor C18 so as to produce a low d.c. smoothed voltage V3.

The switching power supply circuit 305 further includes a switching control circuit 10, which is coupled to the winding Nt3, and a transistor Q6, the base of which is coupled through a resistor R19 to the switching control circuit. As a result, the a.c. voltage acquired from the winding Nt3 of the converter transformer CT1 is provided to the switching control circuit 10, whereupon a switching control signal is generated based upon such voltage and supplied to the switching transistor Q6.

The switching power supply circuit 305 still further includes a running resistor R18, a noise suppression circuit and a protection circuit. The noise suppression circuit includes a diode D18, a capacitor C17 and a resistor R17 which are positioned in a path the current may take when the switching transistor Q6 is turned off. The protection circuit, which includes a capacitor C16 and a resistor R14, is adapted to protect the switching transistor Q6.

In a manner similar to that previously described with reference to the circuit 204 of FIG. 10, when the switching transistor Q6 is on in the circuit 205, current from the winding Nt1 of the CT1 flows between the collector and emitter of the switching transistor Q6 and electromagnetic energy is stored in the winding Nt1. Further, if the switching transistor Q6 is then turned off, an a.c. voltage is generated at the winding Nt2 due to the dissipation of the electromagnetic energy stored in the winding Nt1. This voltage passes through the diode D5 and the smoothing capacitor Co so as to produce a d.c. smoothed voltage Eo.

Furthermore, in a manner similar to that of the aforementioned embodiment(s), while the switching transistor Q1 in the voltage resonance converter 117 is stopped, the voltage V3 flows to the switching power supply circuit 305 by way of the discharge diode D12 and the smoothing capacitor Ci so as to significantly reduce the ripple voltage component of the d.c. input voltage Ei. (The wave forms illustrated in FIG. 6 may be referred to herein.)

A switching power supply apparatus according to a sixth embodiment of the present invention will now be described with reference to FIGS. 12 and 13, which respectively illustrated a circuit 206 and signal wave forms of such circuit. The circuit 206 includes a switching power supply circuit 306 which, in turn, includes an oscillating current converter. Such oscillating current converter, which includes the CDT 10 and the PRT 11, operates in accordance with a series oscillating frequency control technique, such as one of those known in the art.

In the previously described embodiments, the oscillating frequency signal supplied to the switching transistor Q1 is produced by the resonating circuit in the voltage resonance converter 117. However, in the circuit 206 of FIG. 12, such resonating circuit in the voltage resonance converter 117 is omitted. Instead, in the circuit 206, the oscillating voltage converter is operated in synchronization with a switching frequency utilized in the switching power supply circuit 306. (The switching frequency for the switching transistors Q2 and Q3 included in the switching power supply circuit 306 may have a value of 100 kHz).

Figure 12:
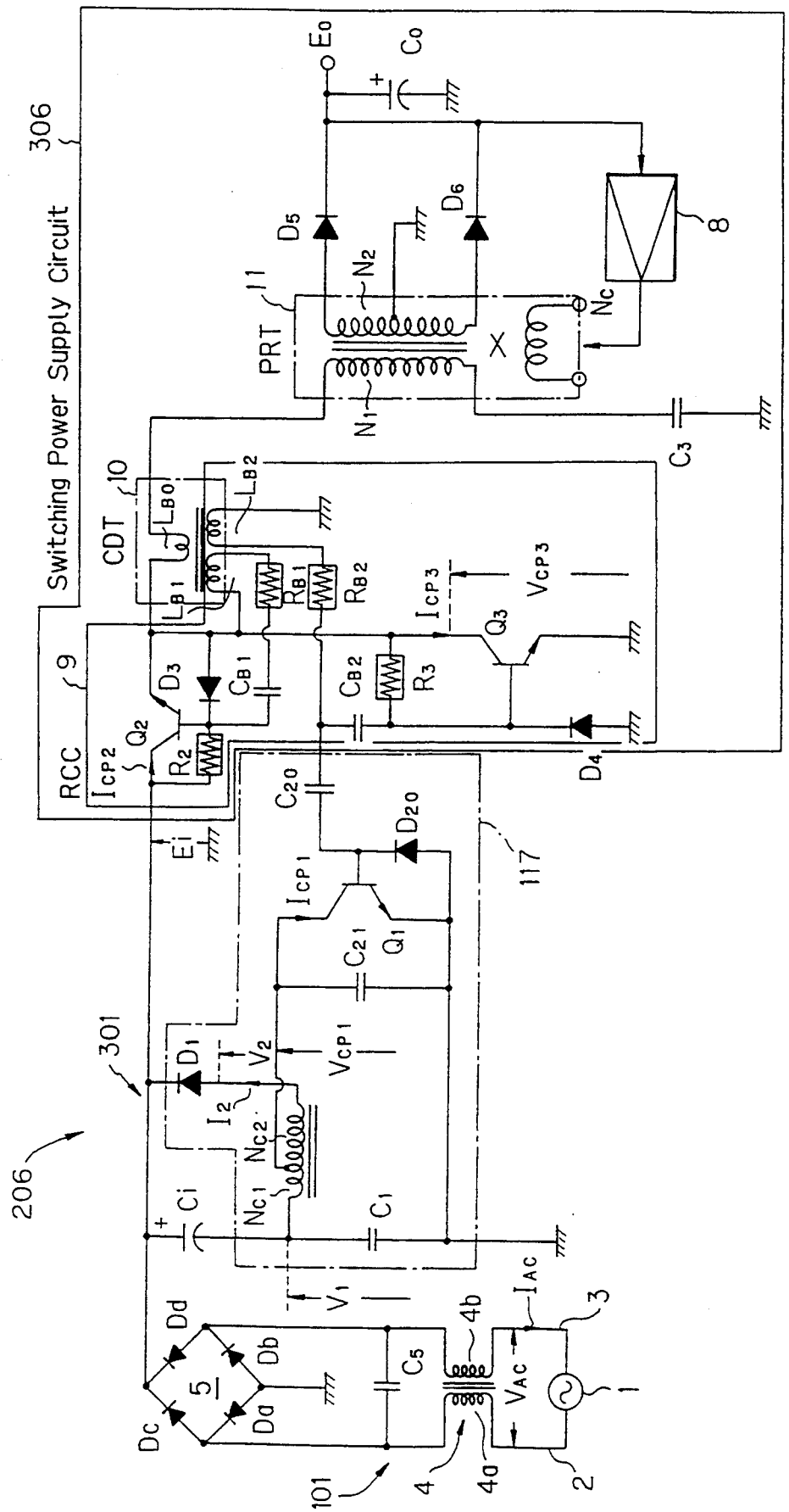
FIG. 12 is a circuit diagram of a switching power supply apparatus according to a sixth embodiment of the present invention, in which a power supply switching circuit section thereof includes a current resonance converter which operates in accordance with a switching frequency control technique.
Figure 13:
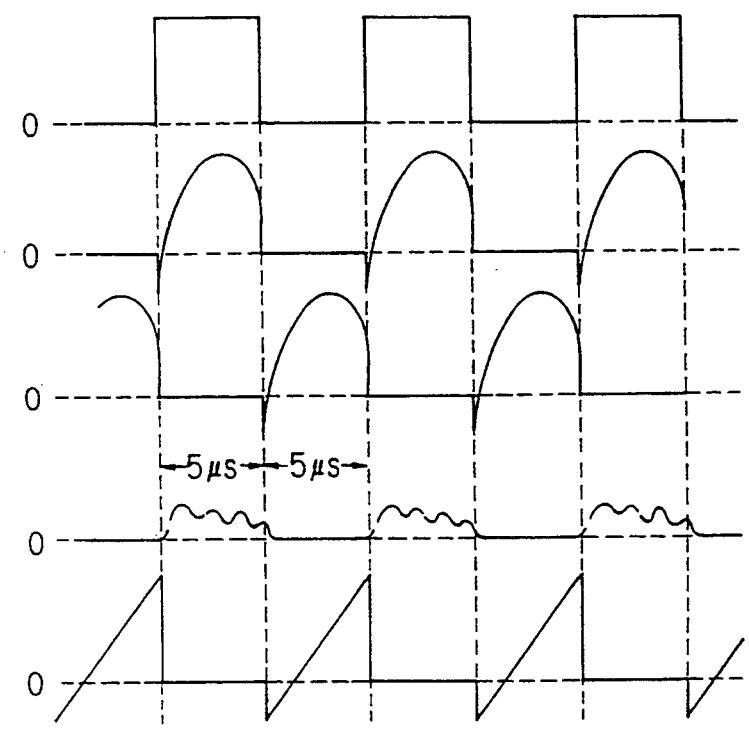
FIGS. 13(a) to 13(e) are diagrams to which reference will be made in explaining the apparatus of FIG. 12.

As shown in FIG. 12, the switching transistor Q1 of the circuit 206 is coupled to the winding Nc1, is coupled in parallel with an oscillation capacitor C21, and is arranged such that a base clamp diode D20 is connected between the base and the emitter of the switching transistor Q1. Further, a fixed time constant capacitor C20 is connected to the base of the switching transistor Q1 and a damping resistor Rb2, which is included in the second self resonating circuit for the switching transistor Q3 in the switching power supply circuit 306 (that is, as previously described, such self resonating circuit includes the winding Lb2 of the drive transformer CDT 10, the fixed time constant capacitor Cb2 and the damping resistor Rb2).

As a result of the above-described arrangement, the switching transistor Q1 may use the self resonating circuit for the switching transistor Q3. As such, the switching transistors Q2 and Q3 are synchronized so as to switch at substantially the same operating frequency, such as, an operating frequency of 100 kHz. (See the collector voltage in FIG. 13(d) and the collector current in FIG. 13(e). See FIGS. 13(a), 13(b) and 13(c) for wave forms for Vcp3, Icp2 and Icp3, respectively.)

As is to be appreciated, since a dedicated self resonating circuit for the switching transistor Q1 is not utilized in the circuit 206, a reduction of the number of components and an associated reduction in cost and a reduction of the surface area needed for mounting the components onto a board (such as a printed circuit board) are obtained. Further, since the switching frequencies for the partial rectification smoothing circuit 301 (in particular, the voltage resonance converter 117) and the switching power supply circuit 306 are the same, magnetic flux leakage and crosstalk due to EMI are either reduced or eliminated. As a result, it may not be necessary to increase the size of the apparatus by installing film capacitors for high frequency noise bypass, secondary side smoothing capacitors such as Co, or utilizing shielding layers or other such measures.

A switching power supply apparatus according to a seventh embodiment of the present invention will now be described with reference to FIG. 14, which illustrates a circuit 207 of such apparatus. In a manner similar to that of circuit 202 of FIG. 7, the circuit 207 includes a switching power supply circuit 307 operated by a current resonance converter which includes the PRT 14 and the PIT 15 and which operates in accordance with a switching frequency control technique.

In the circuit 207, like in the circuit 206, the self resonating circuit in the voltage resonance converter 117 which provides the oscillating frequency signal for the switching transistor Q1 is omitted. Instead, in the circuit 207 (like in the circuit 206), the oscillating voltage converter is operated in synchronization with a switching frequency utilized by the switching power supply circuit 307.

Figure 14:
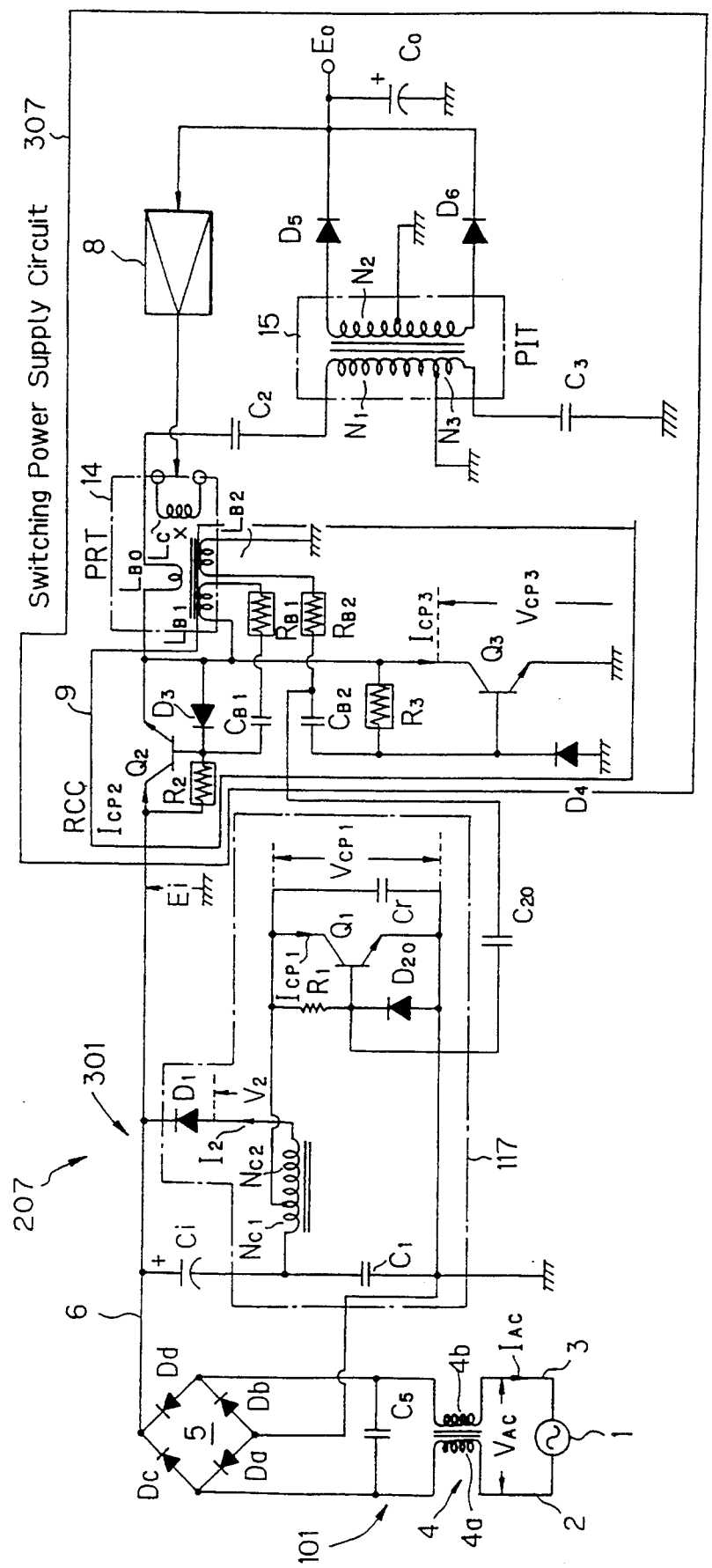
FIG. 14 is a circuit diagram of a switching power supply apparatus according to a seventh embodiment of the present invention, in which a power supply switching circuit section thereof includes a current resonance converter which operates in accordance with a switching frequency control technique.

As shown in FIG. 14, the switching transistor Q1 is coupled to the winding Nc1 and is coupled in parallel to an oscillation capacitor Cr. The switching transistor Q1 is arranged such that the base clamp diode D20 is connected between the base and the emitter of the switching transistor Q1. Further, the fixed time constant capacitor C20 is connected to the base of the switching transistor Q1 and the damping resistor Rb2, which is included in the second self resonating circuit (i.e., the winding Lb2 of the drive transformer PCC 14, the fixed time constant capacitor Cb2 and the damping resistor Rb2) for the switching transistor Q3 in the switching power supply circuit 307.

As a result of the above-described arrangement, the switching transistor Q1 may use the self resonating circuit for the switching transistor Q3. As such, the switching transistors Q1 and Q3 are synchronized so as to switch at substantially the same operating frequency.

A switching power supply apparatus according to an eighth embodiment will now be described with reference to FIGS. 15 and 16, which respectively illustrate a circuit 208 and signal wave forms of such circuit. In a manner similar to that of circuit 203 of FIG. 9, the circuit 208 includes a switching power supply circuit 308 which, in turn, includes a voltage resonance converter having the PRT 17 and the PCC 16 which operates in accordance with a magnetic flux control technique.

As in the circuits 206 and 207, in the circuit 208, the self resonating circuit in the voltage resonance converter 117 which provides the oscillating frequency signal for the switching transistor Q1 is omitted. Instead, in the circuit 208 (like in the circuits 206 and 207), the voltage resonance converter is operated in synchronization with a switching frequency utilized by the switching power supply circuit 308.

Figure 15:
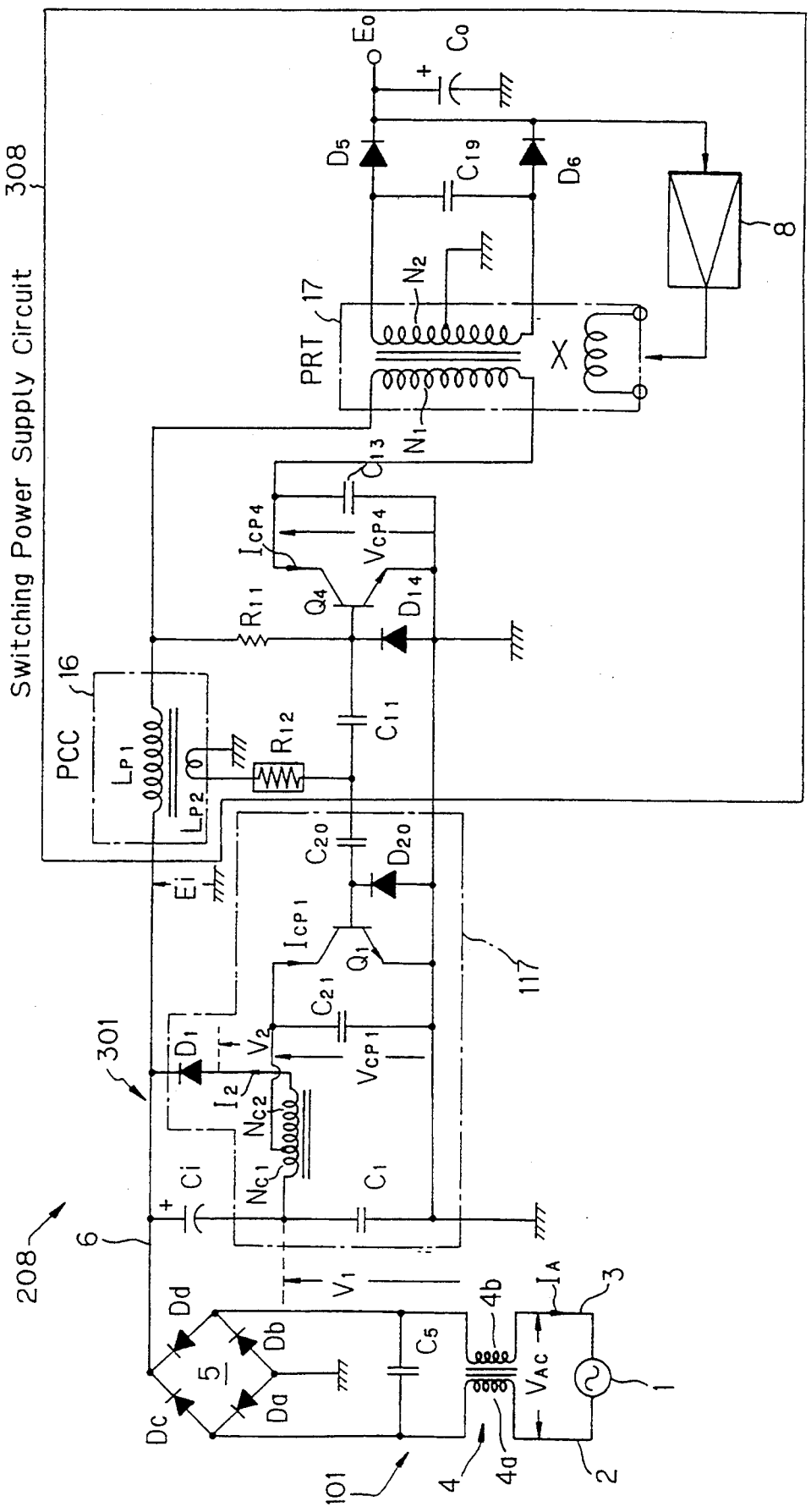
FIG. 15 is a circuit diagram of a switching power supply apparatus according to an eighth embodiment of the present invention, in which a power supply switching circuit section thereof includes a voltage resonance converter which operates in accordance with a magnetic flux control technique.
Figure 16:
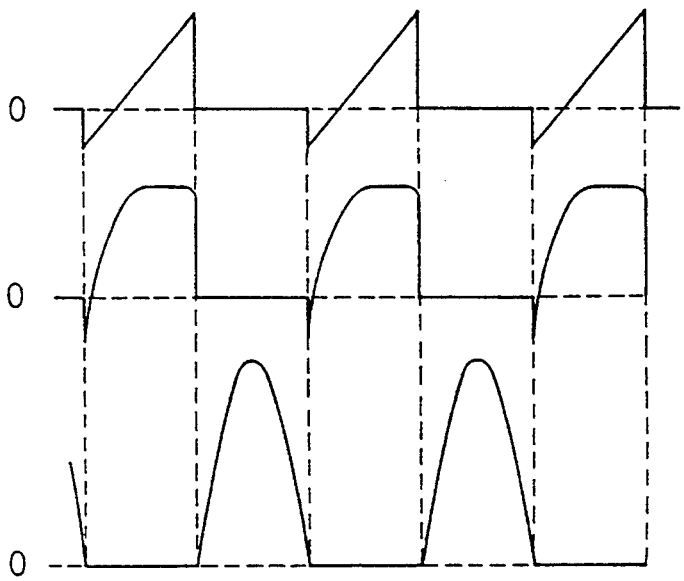
FIGS. 16(a), 16(b) and 16(c) are diagrams to which reference will be made in explaining the apparatus of FIG. 15.

As shown in FIG. 15, the fixed time constant capacitor C20 is coupled to the base of the switching transistor Q1 and the damping resistor R12 in the self resonating circuit (which includes the winding Lp2 of the drive transformer PCC 16, the fixed time constant capacitor C11 and the damping resistor R12) for the switching transistor Q4 in the switching power supply circuit 308. The other components are connected as shown in FIG. 15 in a manner similar to that previously described and, as such, will not be further described herein.

As a result of the above-described arrangement, the switching transistor Q1 may use the self resonating circuit for the switching transistor Q4. Thus, the switching transistors Q1 and Q4 are synchronized so as to switch at substantially the same frequency. Such synchronization is illustrated in FIGS. 16(a), 16(b) and 16(c). As is to be appreciated, advantages similar to those described for circuits 206 and 207 are also obtained for circuit 208.

A switching power supply apparatus according to a ninth embodiment of the present invention will now be described with reference to FIGS. 17 and 18, which respectively illustrate a circuit 209 and signal wave forms of such circuit. In a manner similar to that of circuit 204 of FIG. 10, the circuit 209 includes a switching power supply circuit 309 which includes a rectangular wave-type converter (which may be a flyback converter) having a converter transformer (CT) 1 which operates in accordance with a single core PWM control technique.

In the circuit 209, as in the circuits 206–208, the self resonating circuit in the voltage resonance converter 117 which provides the oscillating frequency signal for the switching transistor Q1 is omitted. Instead, in the circuit 209 (like in the circuits 206–208), the voltage resonance converter is operated in synchronization with a switching frequency utilized by the switching power supply circuit 309.

Figure 17:
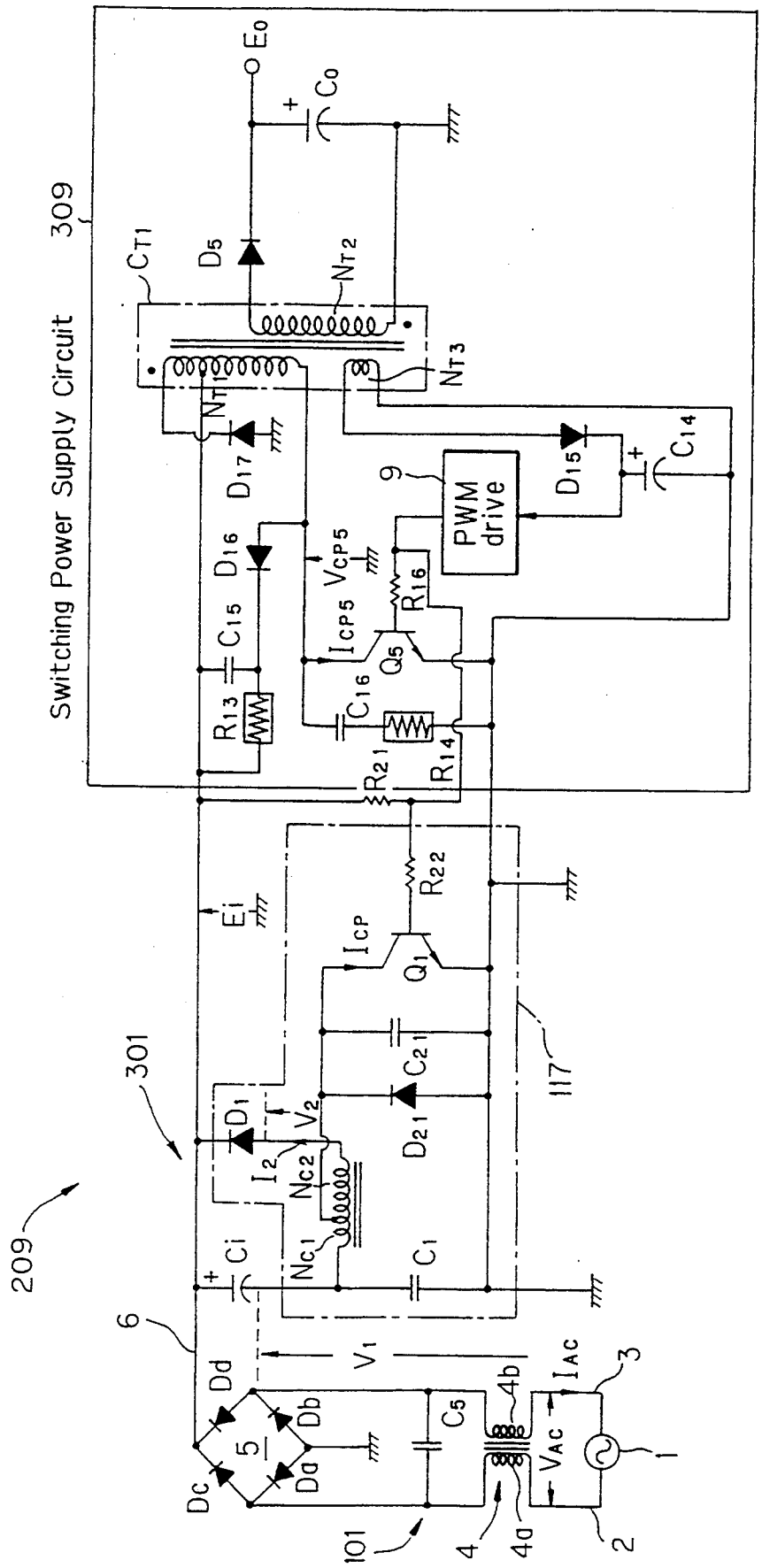
FIG. 17 is a circuit diagram of a switching power supply apparatus according to a ninth embodiment of the present invention, in which a power supply switching circuit section thereof includes a flyback converter which operates in accordance with a PWM control technique.
Figure 18:
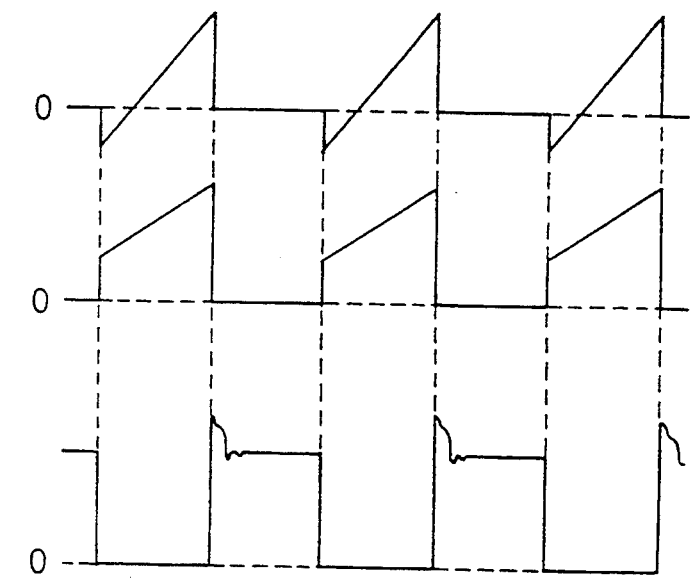
FIGS. 18(a), 18(b) and 18(c) are diagrams to which reference will be made in explaining the apparatus of FIG. 17.

As shown in FIG. 17, a damper and discharge diode D21 is connected between the collector and emitter of the switching transistor Q1 of the voltage resonance converter 117. Further, the PWM drive circuit 9 generates a switching control signal and supplies such signal to the base of the switching transistor Q1 by way of a resistor R22. A resistor R21 is coupled to the switching transistors Q1 and Q5 by way of resistors R22 and R16, respectively, and is adapted to operate as a starting resistor for the switching transistors Q1 and Q5. The other components are connected as shown in FIG. 17 in a manner similar to that previously described and, as such, will not be further described herein.

As a result of the above-described arrangement, the output from the PWM drive circuit 9 may be used for switching both of the switching transistors Q1 and Q5. Accordingly, and as illustrated in FIGS. 18(a), 18(b) and 18(c), the switching transistors Q1 and Q5 are synchronized to switch at substantially the same frequency. As is to be appreciated, advantages similar to those described for circuits 206–208 may be obtained for the circuit 209.

A switching power supply apparatus according to a tenth embodiment will now be described with reference to FIGS. 19 and 20, which respectively illustrate a circuit 210 and signal wave forms of such circuit. The circuit 210 includes a switching power supply circuit 310 which, in turn, includes a forward converter having a converter transformer (CT) 1. This forward converter operates in accordance with a single core PWM control technique.

In the switching power supply circuit 310, a voltage is extracted from the third winding Nt3 of the CT1. This extracted voltage is rectified by the diode D15, smoothed by the capacitor C14 and supplied to the PWM drive circuit 9. Based upon the value of the received voltage, the PWM drive circuit 9 derives a drive pulse therefrom and supplies the same to the base of the switching transistor Q5, whereupon the switching operation is performed such that the output voltage becomes constant.

Figure 19:
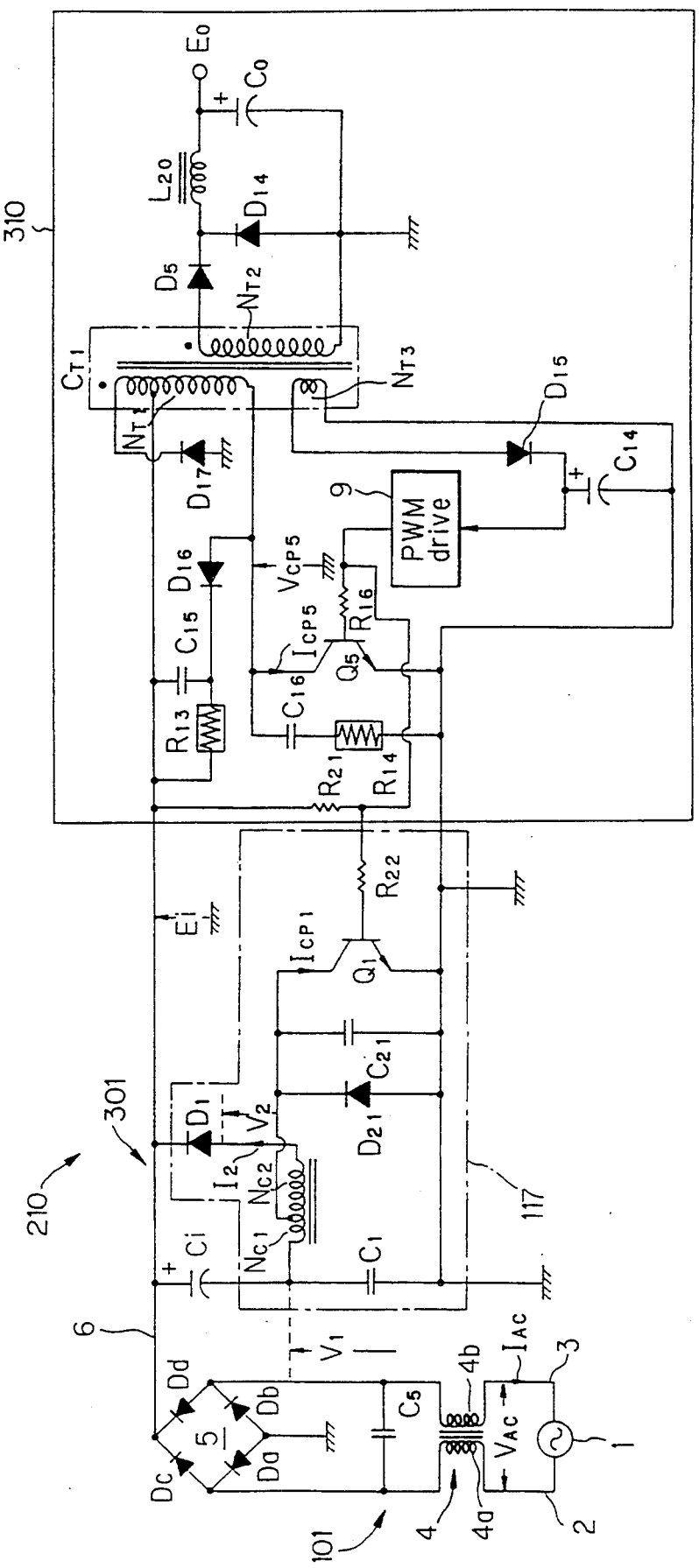
FIG. 19 is a circuit diagram of a switching power supply apparatus according to a tenth embodiment of the present invention, in which a power supply switching circuit section thereof includes a feed-forward converter which operates in accordance with a PWM control technique.

Furthermore, in the switching power supply circuit 310, a flywheel diode D14, a reactor L20, a diode D5 and a capacitor Co are arranged on the secondary winding Nt2 side of the CT1, as shown in FIG. 19.

When the switching transistor Q5 is on, a current from the winding Nt1 of the CT1 flows between the collector and the emitter of the switching transistor Q5. In response, a current will flow from the secondary winding Nt2 through the diode D5 and the smoothing capacitor Co to produce a d.c. voltage Eo and energy will be stored in the reactor L20. On the other hand, when the switching transistor Q5 is off, the energy stored in the reactor L20 is discharged through the flywheel diode D14 so as to produce the d.c. voltage Eo.

Further, as with the circuit 209 of FIG. 17, an output from the PWM drive circuit 9 is supplied to the base of the switching transistor Q1 in the voltage resonance converter 117. Such output from the PWM drive circuit 9 provides a switching control signal for both of the transistors Q1 and Q5. Accordingly, and as illustrated in FIGS. 20(a), 20(b) and 20(c), the switching transistors Q1 and Q5 are synchronized to switch at substantially the same frequency. As a result, the advantages of the circuit 210 are similar to those previously described for the circuits 206–209.

A switching power supply apparatus according to an eleventh embodiment of the present invention will now be described with reference to FIG. 21 which illustrates a circuit 211 of such apparatus. In a manner similar to that of circuit 205 of FIG. 11, the circuit 211 includes a switching power supply circuit 311 which, in turn, includes a rectangular wave-type converter (which may be a ringing choke converter) having a converter transformer (CT) 1 which operates in accordance with a single core switching frequency control technique.

Figure 21:
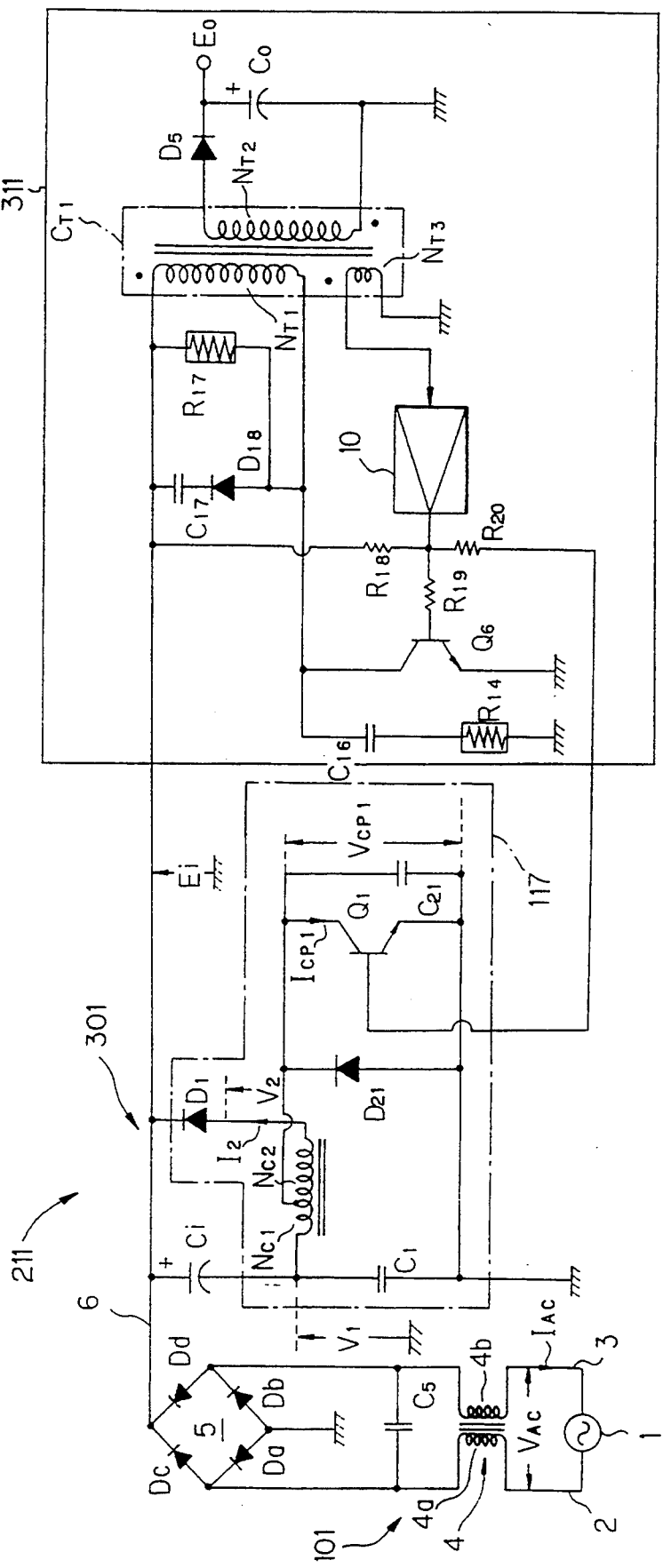
FIG. 21 is a circuit diagram of a switching power supply apparatus according to an eleventh embodiment of the present invention, in which a power supply switching circuit section thereof includes a ringing choke converter which operates in accordance with a switching frequency control technique.

As shown in FIG. 21, the switching power supply circuit 311 includes a switching control circuit 10 coupled to the winding Nt3 of the CT1. Such switching control circuit 10 is further coupled through a resistor R19 to the base of the switching transistor Q6 and through a resistor R20 to the base of the switching transistor Q1. A resistor R18 is coupled to the switching control circuit 10. As a result of such arrangement, the a.c. voltage acquired from the winding Nt3 of the CT1 is supplied to the switching control circuit 10 so as to be utilized therein to generate a switching control signal which is supplied to the base of the switching transistor Q6 and to the base of the switching transistor Q1 in the voltage resonance converter 117. Thus, the switching control circuit 10 provides a switching control signal to both of the transistors Q1 and Q6 so as to control and synchronized the switching of each of these transistors. As a result, the advantages of the circuit 211 are similar to those previously described for the circuits 206–210.

Furthermore, in the circuits 206–211, if the discharge capacity of the oscillation capacitor C21, which is connected in parallel with the switching transistor Q1, is set so as to have a relatively small value, the rectifying and smoothing operation performed by the circuit 301 for improving the power efficiency may be acceptable even if the on/off operation is controlled.

Figure 22:
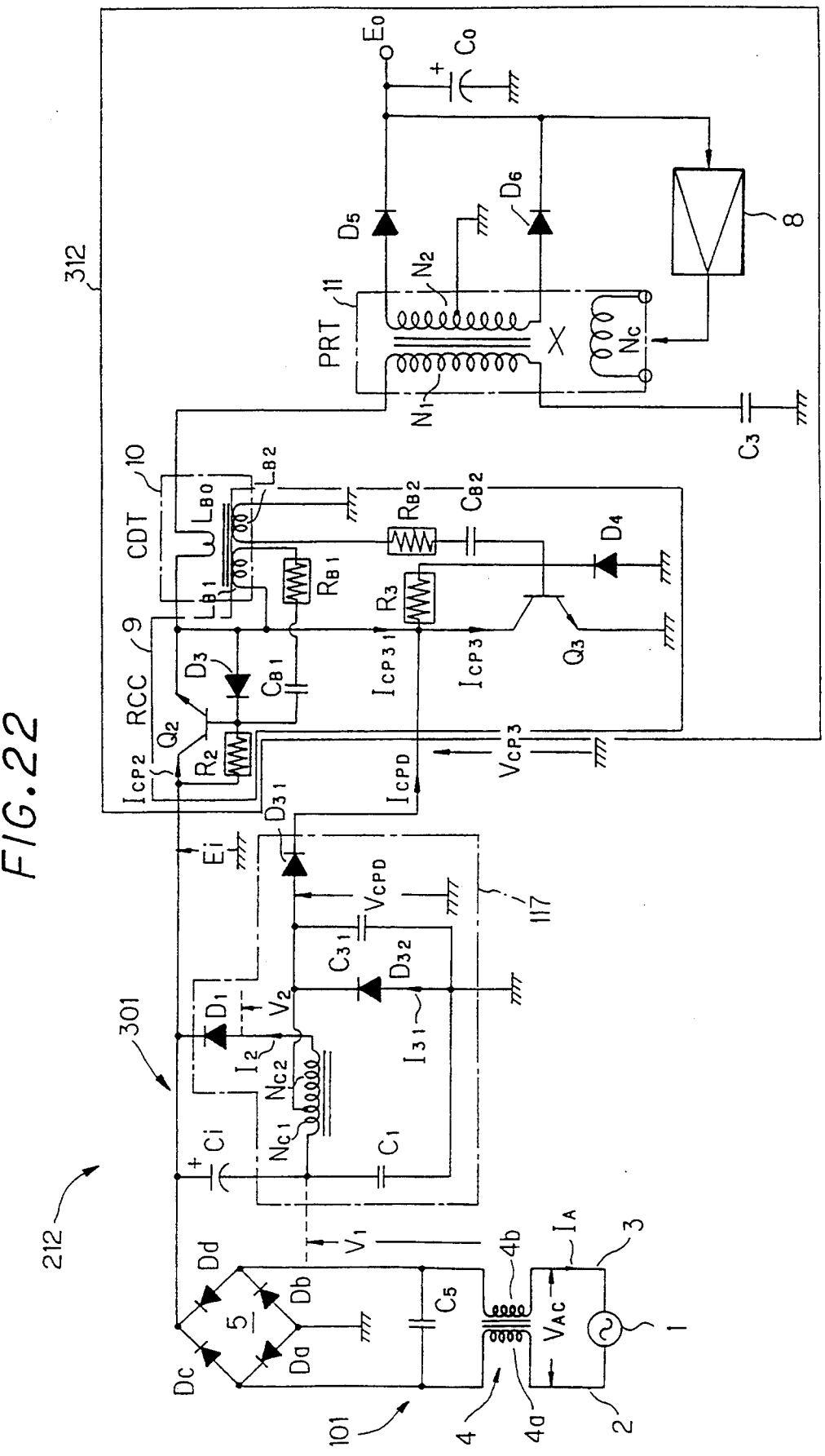
FIG. 22 is a circuit diagram of a switching power supply apparatus according to a twelfth embodiment of the present invention, in which a power supply switching circuit section thereof includes a current resonance converter which operates in accordance with a switching frequency control technique.

A switching power supply apparatus according to a twelfth embodiment of the present invention will now be described with reference to FIGS. 22, 23 and 24, in which FIG. 22 illustrates a circuit 212 and FIGS. 23(a) to 23(f) and FIGS. 24(a) to 24(g) illustrate signal wave forms pertaining to this circuit. The circuit 212 includes a switching power supply circuit 312 which, in turn, includes a current resonance converter. Such current resonance converter, which includes the CDT 10 and the PRT 11, operates in accordance with a series resonating frequency control technique, as in the circuit 201 of FIG. 5.

In the circuit 212, to simplify the voltage resonance converter 117, the oscillating switch (i.e., the switching transistor Q1) has been omitted. In place of the switching transistor Q1, one of the switching transistors for the switching power supply circuit 312 is used as the oscillating switch for the voltage resonance converter 117.

In the voltage resonance converter 117 of the circuit 212 as shown in FIG. 22, an oscillation capacitor C31 is coupled to the winding Nc1 and is coupled in parallel to a damping and discharge diode D32. A connection diode D31 is connected to the oscillation capacitor C31 and to the collector of the switching transistor Q3 in the switching power supply circuit 312.

The switching transistors Q2 and Q3 may be repeatedly turned on and off by the oscillating frequency signals provided by their respective self resonating circuits (i.e., winding Lb1, resistor Rb1, capacitor Cb1 and winding Lb2 resistor Rb2, capacitor Cb2).

During the period t shown in FIG. 24, the switching current Icpd flows through the connection diode D31 when the a.c. input voltage Vac is relatively high. Further during this period t, the collector current Icp3 for the switching transistor Q3 is composed of the current Icp31 and the switching current Icpd. Such collector current is shown in FIG. 24(g). Furthermore during the period t, the current I31 flowing through the diode D32 when the voltage resonance converter 117 is switching is the negative damping current of the current Icpd. However, at times outside of this period t when the diode D31 is off, the discharge current from the capacitor C31 flows towards the switching power supply circuit 312. The other portions of FIG. 24 not specifically described illustrate wave forms of various voltages or currents which may occur at the respective indicated location in the circuit 212 and, as such, are believed to be self explanatory.

Switching operation wave diagrams corresponding to the period t in FIG. 24 and to a.c. input voltage Vac peaks, are shown in FIG. 23. For example, the voltage Vcpd flowing between the connection diode D31 and the capacitor C31 and the current Icpd flowing through the connection diode D31 are shown in FIGS. 23(e) and 23(d), respectively. Further, the collector current Icp3 flowing through the switching transistor Q3, which is made up of the current Icpd (FIG. 23(d)) and the current Icp31 (FIG. 23(C)), is shown in FIG. 23(f). FIGS. 23(a) and 23(b) respectively illustrate the voltage Vcp3 and the current Icp2.

As a result of the above-described arrangement, the switching transistor Q1 for the voltage resonance converter 117 and the corresponding self resonating circuit may be omitted. Thus, a reduction in the number of components, in the cost and in the surface area of the board may be obtained. Further, as the switching frequencies for the partial rectification smoothing circuit 301 (in particular, the voltage resonance converter 117) and the switching power supply circuit 312 are substantially the same, magnetic flux leakage and crosstalk due to EMI may be reduced or eliminated. Thus, the size of the apparatus may not have to be increased due to the installation of film capacitors for high frequency noise bypass, secondary side smoothing capacitors such as CO, shielding layers or other such devices or by utilizing other similar measures.

Figure 1:
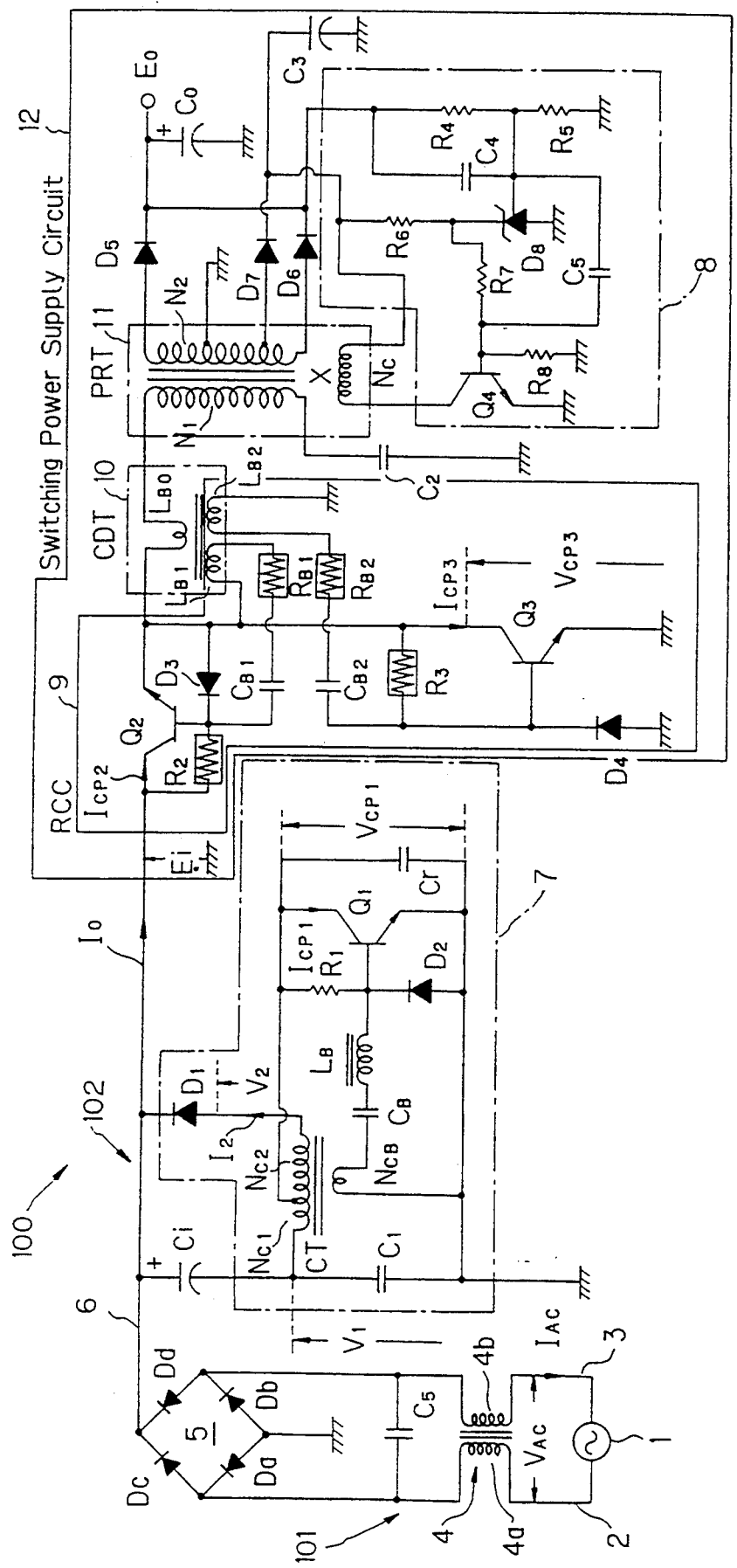
FIG. 1 is a circuit diagram of a switching power supply apparatus according to the prior art.

Furthermore, as an example, with a power load of 153 W, an a.c. voltage of 110 V at 50 Hz, and a smoothing capacitance Ci of 1000 $\mu$F, the power efficiency and electrical power loss is similar to that obtained for the circuit 100 of FIG. 1.

A switching power supply apparatus according to a thirteenth embodiment of the present invention will now be described with reference to FIGS. 25 and 26, which respectively illustrate a circuit 213 and signal wave forms of such circuit. In a manner similar to that of circuit 202 of FIG. 7, the circuit 213 includes a switching power supply circuit 313 operated by a current resonance converter which includes the PRT 14 and the PIT 15 and which operates in accordance with a switching frequency control technique. In this embodiment, and in a manner similar to that of the circuit 212 of FIG. 22, the oscillating switch (switching transistor Q1) for the voltage resonance converter 117 is omitted, and in place thereof, a switching transistor Q42 for the switching power supply circuit 313 functions as the oscillating switch for the voltage resonance converter 117.

Figure 25:
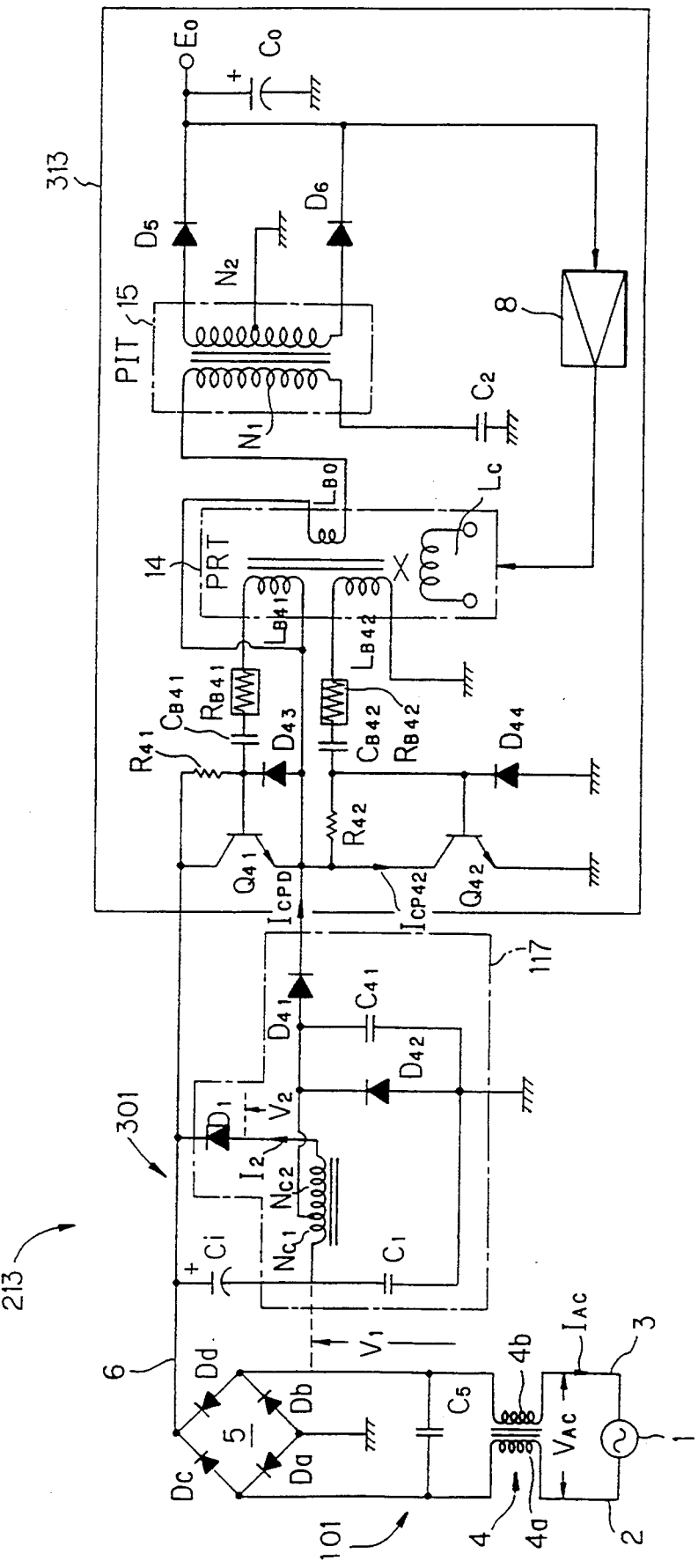
FIG. 25 is a circuit diagram of a switching power supply apparatus according to a thirteenth embodiment of the present invention, in which a power supply switching circuit section thereof includes a current resonance converter operating in accordance with a switching frequency control technique.

As shown in FIG. 25, in the voltage resonance converter 117 of circuit 213, an oscillation capacitor C41 is coupled to the winding Nc1 and is coupled in parallel to a damping and discharge diode D42. A connection diode D41 is connected to the oscillation capacitor C41. The cathode of the connection diode D41 is connected between the switching transistors Q41 and Q42 for a half bridge connection in the switching power supply circuit 313.

The switching transistor Q41 is switched by the self resonating circuit, which includes the winding Lb41 of the PRT 14 (which functions as the drive transformer), the damping resistor Rb41, and the fixed time constant capacitor Cb41. The switching transistor Q42 is switched by the self resonating circuit, which includes the winding Lb42 of the PRT 14 which functions as the drive transformer, the damping resistor Rb42, and the fixed time constant capacitor Cb42. Resistors R41 and R42 are starting resistors for the switching transistors Q41 and Q42, respectively, and diodes D43 and D44 are base clamping diodes for the switching transistors Q41 and Q42, respectively.

Figure 26:
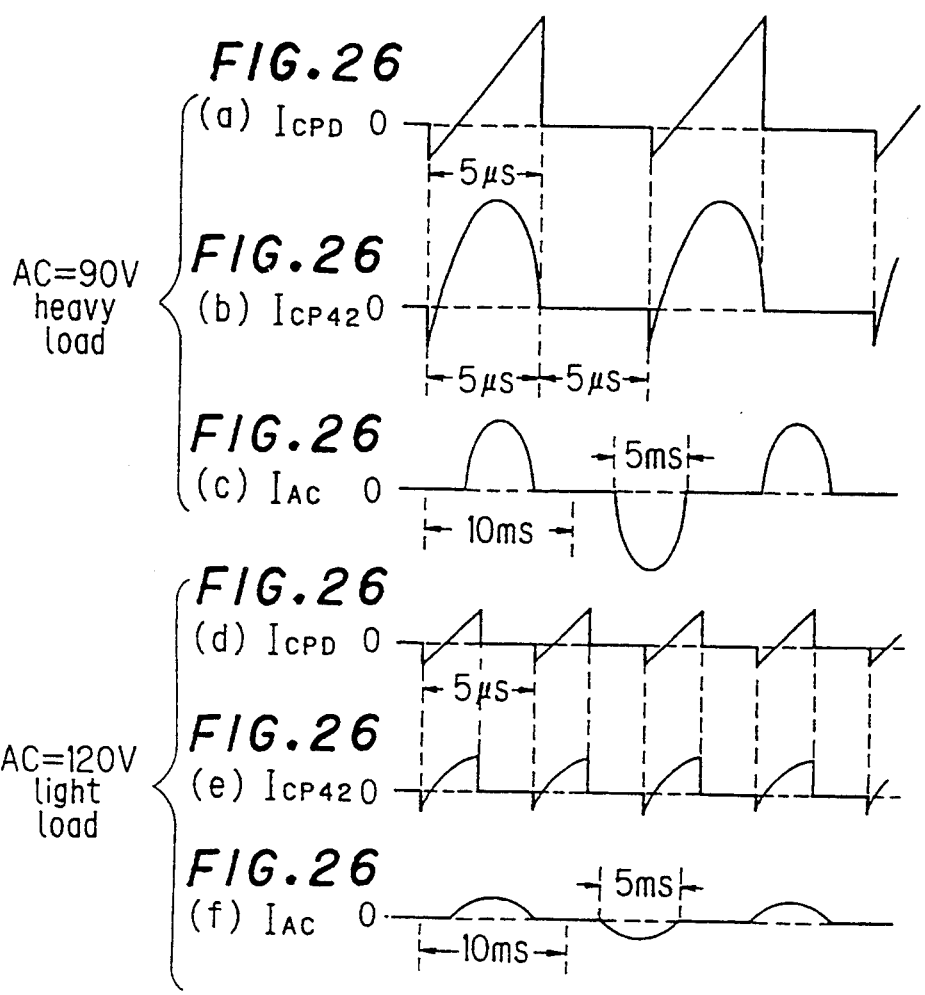
FIGS. 26(a) to 26(f) are diagrams to which reference will be made in explaining the apparatus of FIG. 25.

FIGS. 26(a), 26(b) and 26(c) respectively illustrate the current Icpd for the connection diode D41, the collector current Icp42 for the switching transistor Q42 and the a.c. input current while the voltage resonance converter 117 is switching for relatively heavy loads and an a.c. voltage of 90 V. FIGS. 26(d), 26(e) and 26(f) respectively illustrate the same currents for relatively light loads and an a.c. voltage of 120 V. Similar operating wave forms for light loads and heavy loads for the circuit 100 of FIG. 1 are shown in FIG. 4, which can be compared with those of FIG. 26.

In circuit 100 of FIG. 1, a difference exists between the switching period for the voltage resonance converter 7 (which is 100 kHz) and the switching period for the switching power supply circuit 12 (which is 83.3 kHz). On the other hand, in the circuit 213, the switching frequencies for the voltage resonance converter 117 and the switching power supply circuit 313 are synchronized. As an example, the frequency may have a value of 100 kHz when there is a relatively heavy load and the a.c. voltage lower limit is 90 V, and may have a value of 200 kHz when there is a relatively light load and the upper limit of the a.c. voltage is 120 V. As a result, an advantage is obtained in that the flow angle for the current Iac remains approximately constant regardless of changes in the load. Such advantage means that the power efficiency (which may have a value of approximately 0.85) remains stable for relatively heavy loads.

Figure 27:
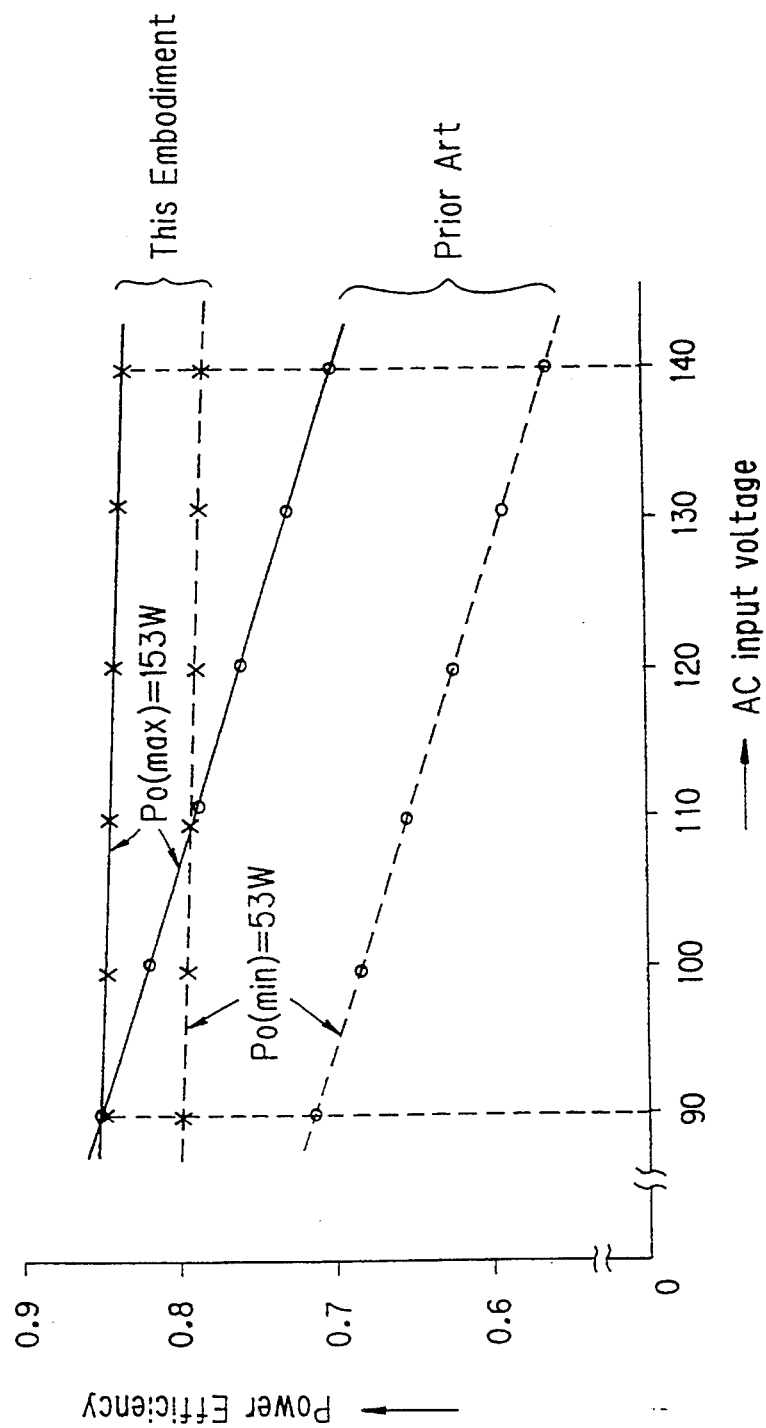
FIG. 27 is a diagram to which reference will be made in explaining power efficiency characteristics of the apparatus of FIG. 25.

FIG. 27 illustrates a comparison of how the power efficiency varies with changes in the a.c. input voltage and load for this embodiment (circuit 213) and the circuit 100 of the prior art of FIG. 1. The values in FIG. 27 were obtained by using circuits having an electrical power load (P0) of 153 W to 53 W, a 1000 mF smoothing capacitor Ci, a switching frequency of 1000 kHz and an a.c. line frequency of 50 Hz. As shown in FIG. 27, with the circuit 100 of FIG. 1, the power efficiency varied between 0.85 and 0.57 for an a.c. voltage of 90 V to 140 V and a power load (P0) of 153 W to 53 W. Whereas, for the circuit 213, the power efficiency only varied between a value of 0.85 and 0.79, that is, a variation of 0.06.

Thus, the switching power supply apparatus represented by the circuit 213 can maintain an approximately constant power efficiency, even with variations in the a.c. input voltage and load. Such apparatus which operates smoothly with an improved power supply high frequency distortion capability can be installed in various items of equipment.

Furthermore, as previously described, the switching transistor Q1 for the voltage resonance converter 117 and the corresponding self resonating circuit may be omitted. Thus in the circuit 213, in a manner similar to that previously described with regard to the circuit 212, a reduction in the number of components, in the cost and in the surface area of the board may be obtained. Further, since the switching frequencies for the partial rectification smoothing circuit 301 (in particular, the voltage resonance converter 117) and the switching power supply circuit 313 are substantially the same, magnetic flux leakage and crosstalk due to EMI may be reduced or eliminated. Therefore, it may not be necessary to increase the size of the apparatus due to the installation of film capacitors for high frequency noise bypass, secondary side smoothing capacitors such as Co, shielding layers or the like.

Figure 28:
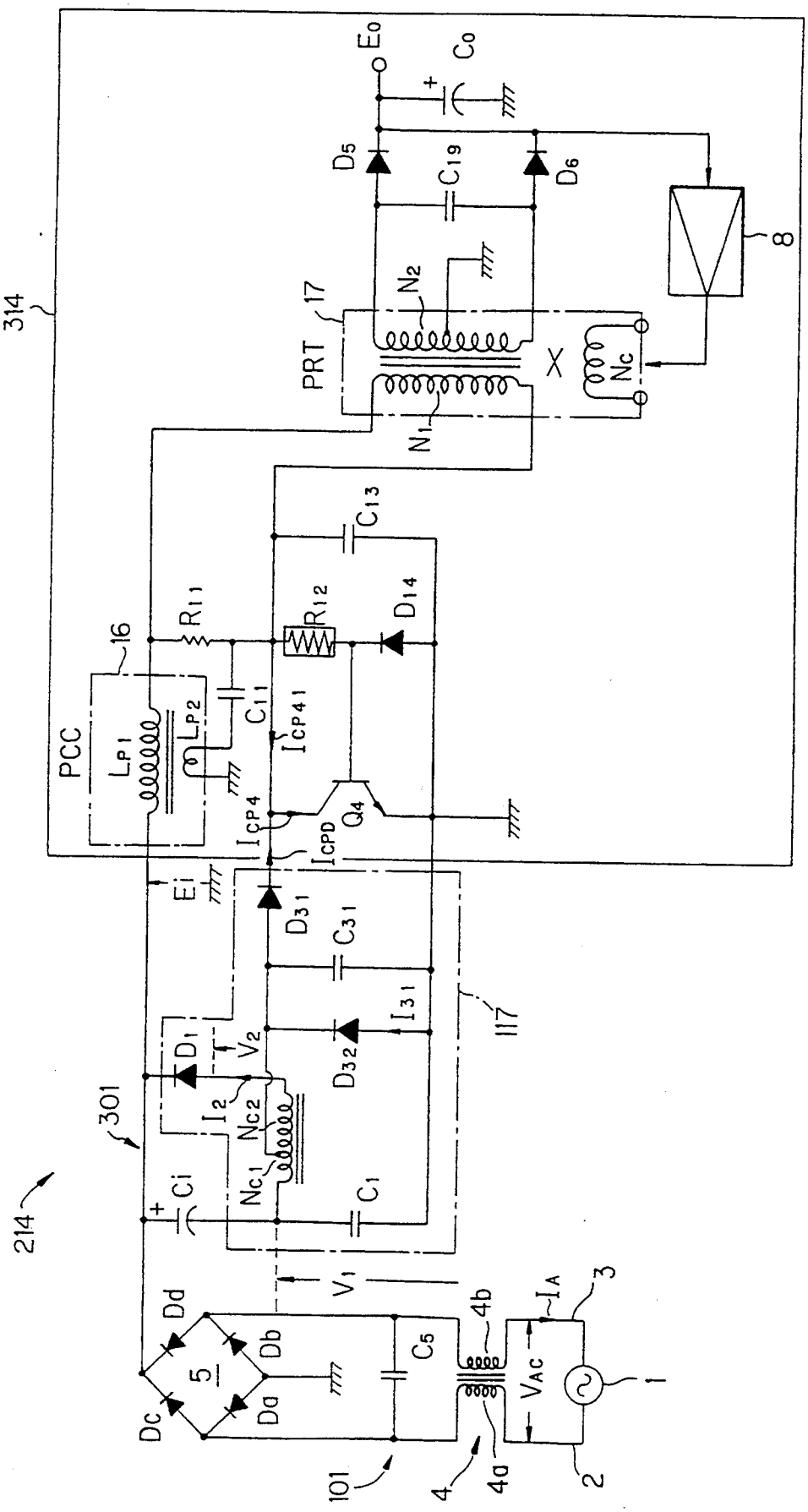
FIG. 28 is a circuit diagram of a switching power supply apparatus according to a fourteenth embodiment of the present invention, in which a power supply switching circuit section thereof includes a voltage resonance converter which operates in accordance with a magnetic flux control technique.
Figure 29:
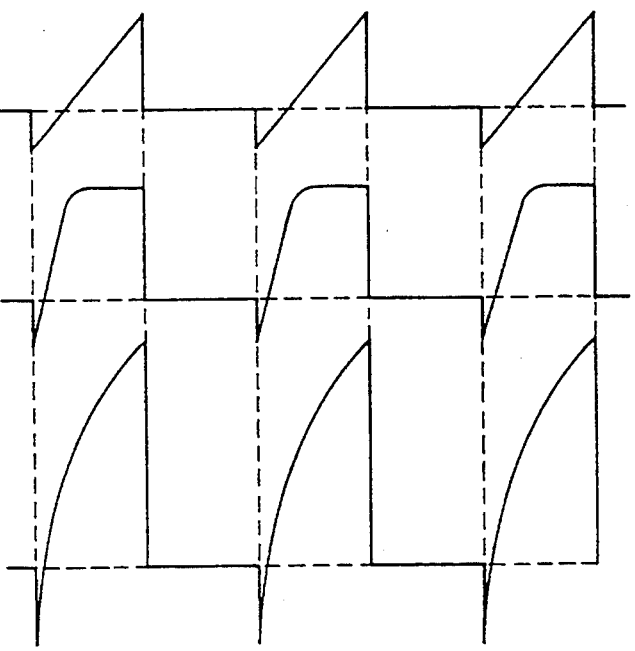
FIGS. 29(a), 29(b) and 29(c) are diagrams to which reference will be made in explaining the apparatus of FIG. 28.

A switching power supply apparatus according to a fourteenth embodiment of the present invention will now be described with reference to FIGS. 28 and 29, in which FIG. 28 illustrates a circuit 214 and FIGS. 29(a), 29(b) and 29(c) illustrate signal wave forms pertaining to such circuit. In a manner similar to that of circuit 303 of FIG. 9, the circuit 214 includes a switching power supply circuit 314 having a voltage resonance converter which includes the PCC 16 and the PRT 17 and which operates in accordance with a magnetic flux control technique.

As shown in FIG. 28, the circuit 214 includes a connection diode D31 and an oscillation capacitor C31 which are coupled together. The cathode of the connection diode D31 is connected to the collector of the switching transistor Q4 of the switching power supply circuit 314. A switching current Icpd flows through the connection diode D31 during the switching operation of the voltage resonance converter 117. Such current Icpd may be combined with a current Icp41 to form a current Icp4 which flows through the collector of the switching transistor Q4. FIGS. 29(a), 29(b) and 29(c) respectively illustrate these currents.

As a result of the above-described arrangement, the switching transistor Q4 may also be used as the oscillating switch (switching transistor) for the voltage resonance converter 117. Accordingly, advantages similar to those obtained from the circuits 212 and 213 (which were previously described) may be obtained herein.

A switching power supply apparatus according to a fifteenth embodiment will now be described with reference to FIGS. 30 and 31, which respectively illustrate a circuit 215 and signal wave forms of such circuit. In a manner similar to that of circuit 204 of FIG. 10, the circuit 215 includes a switching power supply circuit 315 having a rectangular wave-type converter (which may be a flyback converter) which includes the CT1 and which operates in accordance with a single core PWM control technique.

Figure 30:
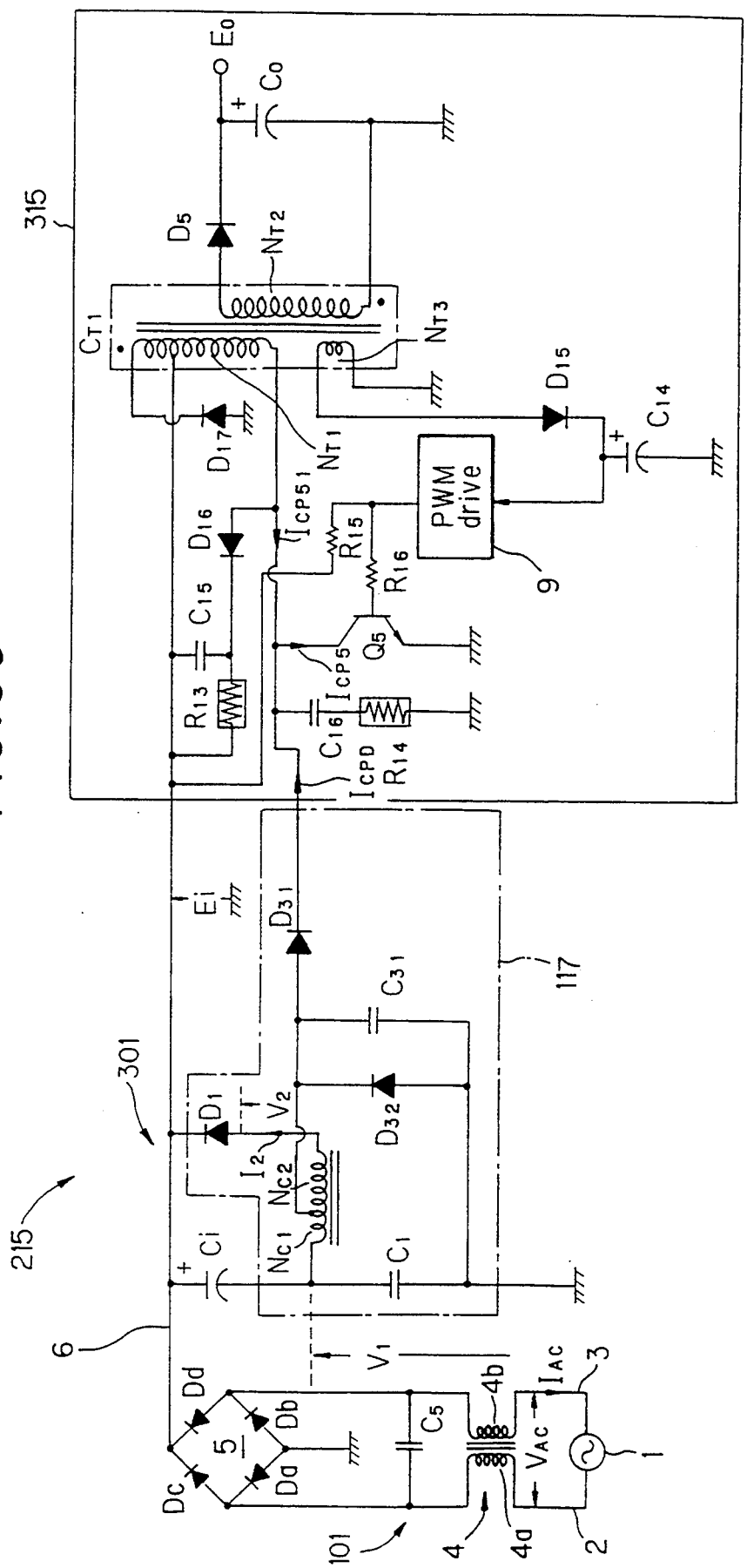
FIG. 30 is a circuit diagram of a switching power supply apparatus according to a fifteenth embodiment of the present invention, in which a power supply switching circuit section thereof includes a flyback converter which operates in accordance with a PWM control technique.

As shown in FIG. 30, the circuit 215 includes a connection diode D31 and an oscillation capacitor C31 which are coupled together. The cathode of the connection diode D31 is coupled to the collector of the switching transistor Q5 of the switching power supply circuit 315. A current Icpd from the voltage resonance converter 117 is combined with a current Icp51 to form a current Icp5 which flows through the collector of the switching transistor Q5. FIGS. 31(a), 31(b) and 31(c) respectively illustrate the switching current Icpd during the switching operation of the voltage resonance converter 117, the current Icp51 and the collector current Icp5 for the switching transistor Q5.

Advantages and results similar to those obtained and previously described with regard to circuits 212–214 may also be obtained with circuit 215.

Figure 32:
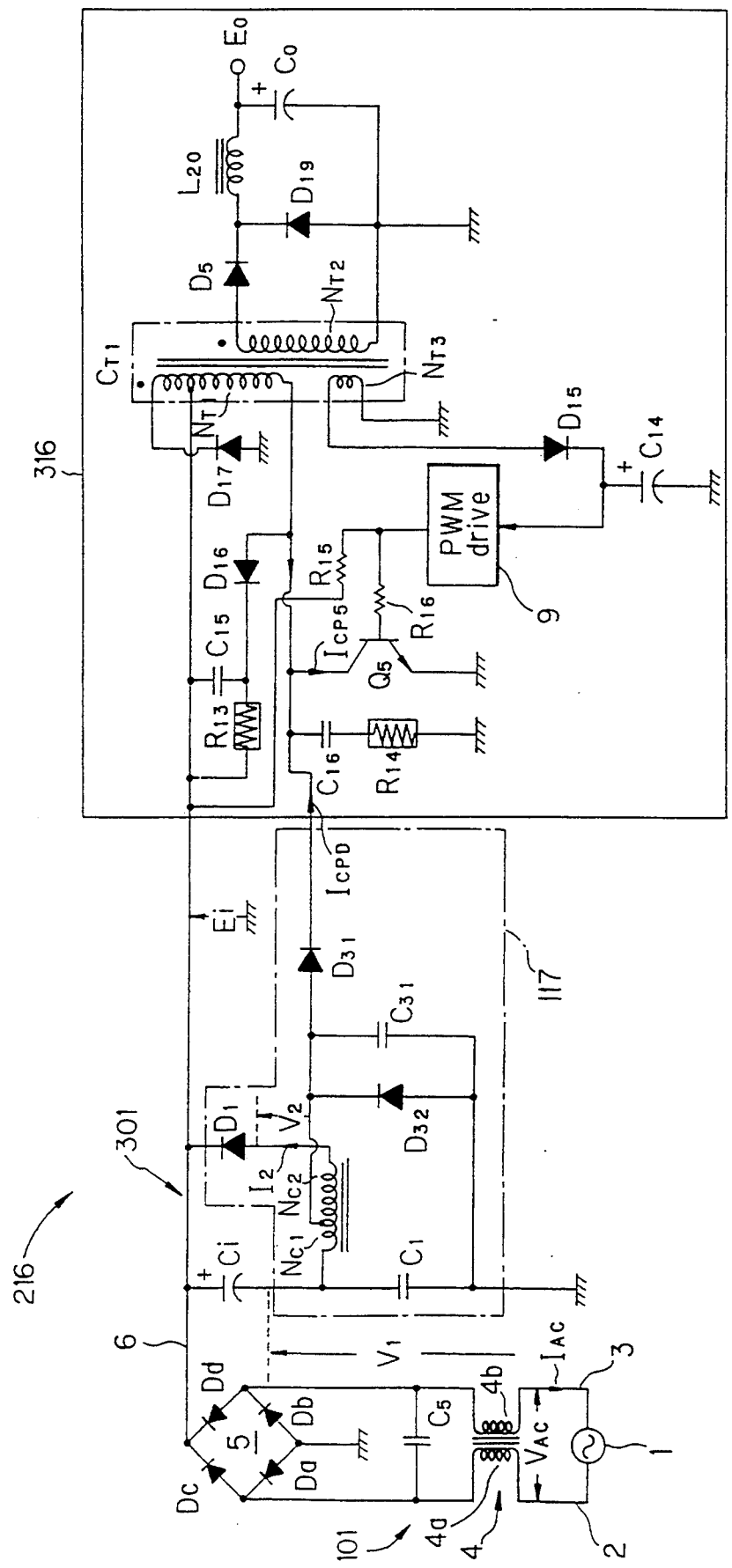
FIG. 32 is a circuit diagram of a switching power supply apparatus according to a sixteenth embodiment of the present invention, in which a power supply switching circuit section thereof includes a feed-forward converter which operates in accordance with a PWM control technique.

A switching power supply apparatus according to a sixteenth embodiment of the present invention will now be described with reference to FIGS. 32 and 33, which respectively illustrate a circuit 216 and signal wave forms for such circuit. In a manner similar to that of circuit 210 of FIG. 19, the circuit 216 includes a switching power supply circuit 316 which includes a forward converter having the CT1 and which operates in accordance with a single core PWM control technique.

In the circuit 216, as in the circuit 215 of FIG. 30, the cathode of the connection diode D31 is connected to the collector of the switching transistor Q5 of the switching power supply circuit 316. FIGS. 33(a), 33(b) and 33(c) respectively illustrate the currents Icpd, Icp51 and Icp5. Accordingly, the switching transistor Q5 also functions as the oscillation switch for the voltage resonance converter 117, so as to provide similar results and advantages as were obtained from the circuits 212–215.

Figure 34:
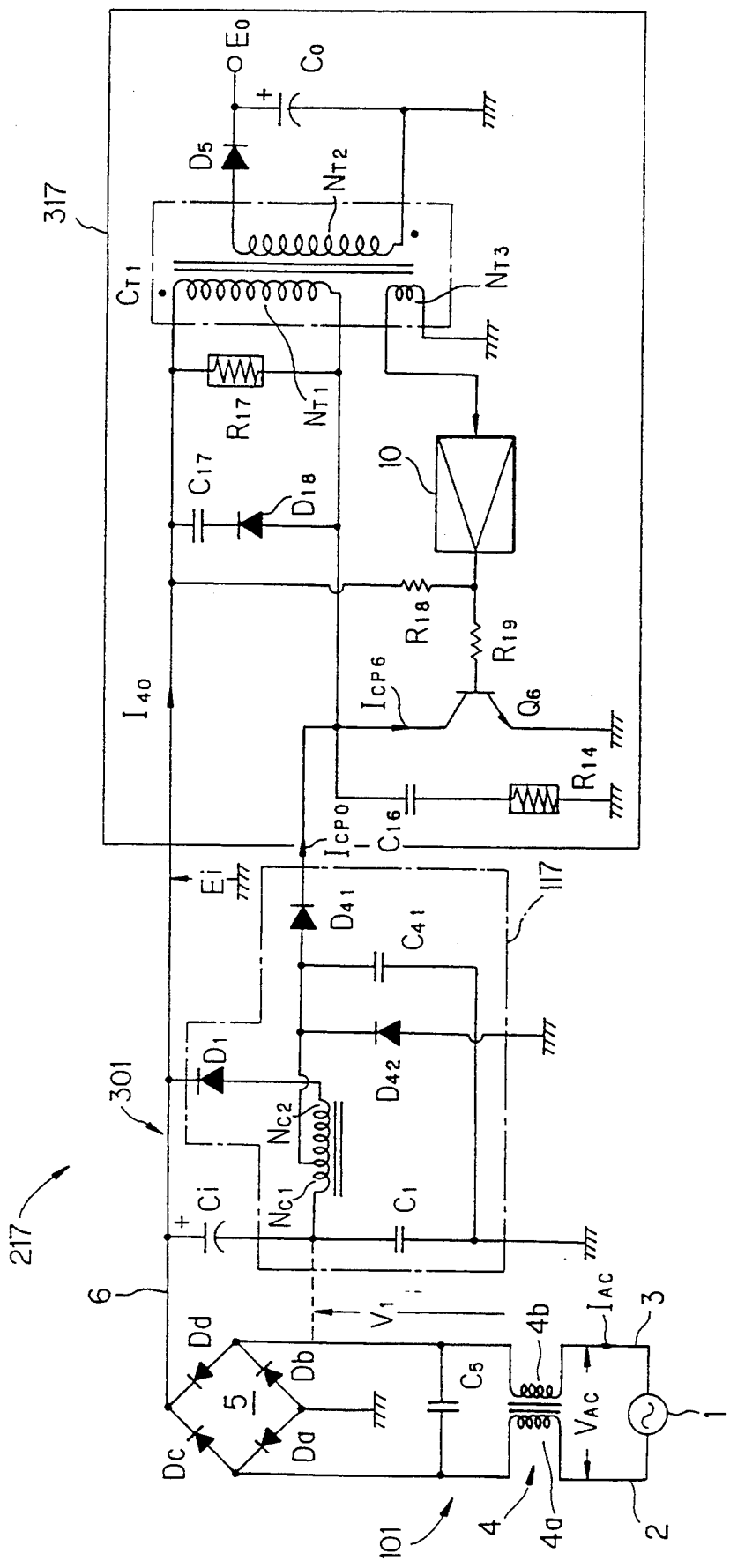
FIG. 34 is circuit diagram of a switching power supply apparatus according to a seventeenth embodiment of the present invention, in which a power supply switching circuit section thereof includes a ringing choke converter which operates in accordance with a switching frequency control technique.

A switching power supply apparatus according to a seventeenth embodiment of the present invention will now be described with reference to FIGS. 34 and 35, which respectively illustrate a circuit 217 and signal wave forms for such circuit. In a manner similar to that of circuit 205 of FIG. 11, the circuit 217 includes a switching power supply circuit 317 which includes a rectangular wave-type converter (which may be a ringing choke converter) having the CT1 and which operates in accordance with a solid (single core) switching frequency control technique.

In the circuit 217, the voltage resonance converter 117 and the switching power supply circuit 317 switch in synchronization with each other. The collector current Icp6 for the switching transistor Q6 is composed of a current Icpd flowing through a connection diode D41 and a current I40. (See FIGS. 35(a), 35(b) and 35(c) for wave forms of these currents.) The ratio of the rise in the a.c. current input voltage to the low load may be controlled by increasing the switching frequency. The power efficiency remains approximately constant, even when there are variations in the a.c. input voltage and load, as in the circuit 213 of FIG. 25.

A switching power supply apparatus according to an eighteenth embodiment of the present invention will now be described with reference to FIGS. 36 and 37, which respectively illustrate a circuit 218 and signal wave forms for such circuit. The circuit 218 (which is a variation of the circuit 213 of FIG. 25) includes a switching power supply circuit 318 which includes a current resonance converter, having a PRT and a PIT, which operates in accordance with a switching frequency control technique. This apparatus is suitable for high power loads, such as those in excess of 300 W.

Figure 36:
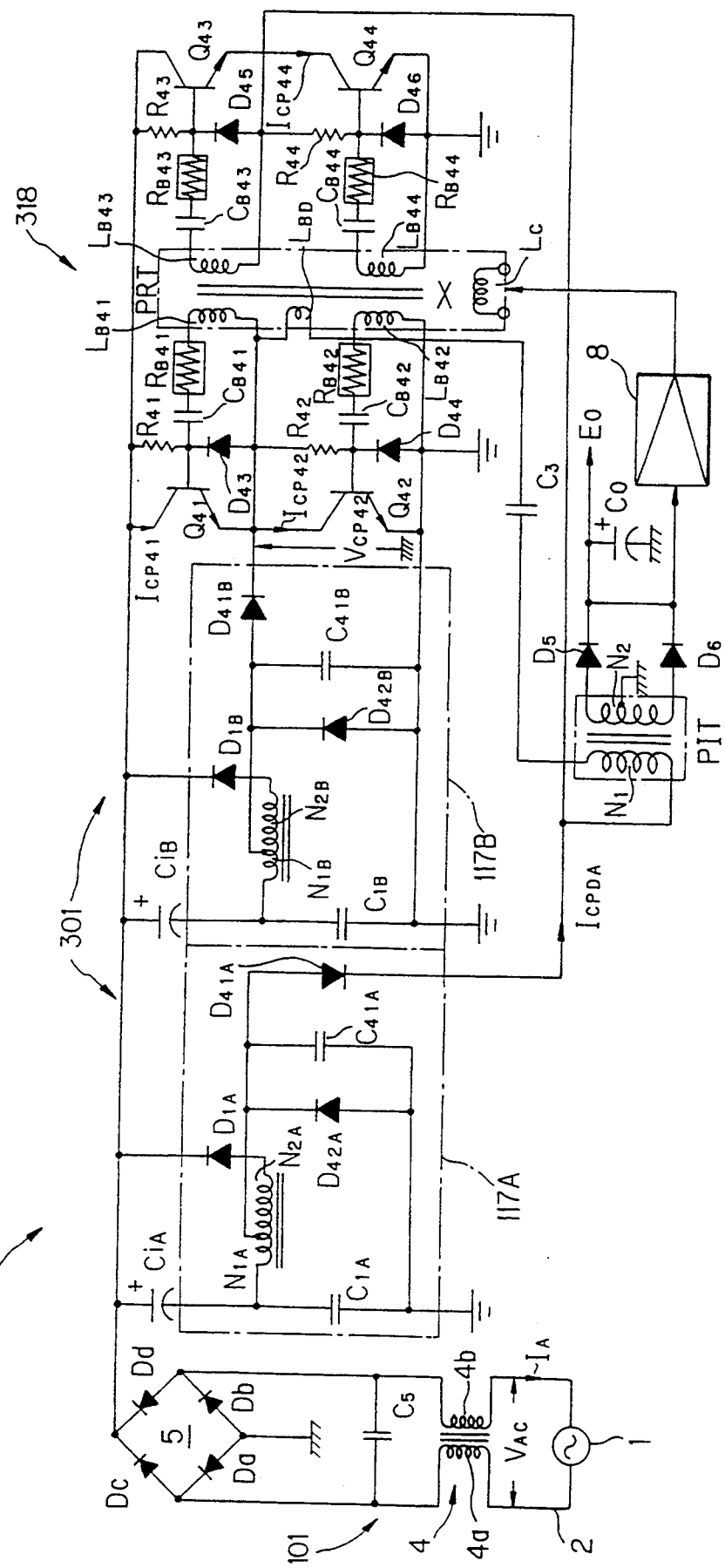
FIG. 36 is a circuit diagram of a switching power supply apparatus according to an eighteenth embodiment of the present invention.

As shown in FIG. 36, the circuit 218 includes two partial rectification smoothing circuits 301 having two voltage resonance converters (117A and 117B) and smoothing capacitors CiA and CiB, and a full bridge connection made up of switching transistors Q41 to Q44. The two partial rectification smoothing circuits 301 are coupled together as shown in FIG. 36. Since each of the voltage resonance converters 117A and 117B are substantially similar to those described in other embodiments (such as those of embodiments 14 and 15), a further description relating thereto is omitted.

The switching transistor Q41 is coupled to a self resonating circuit made up of winding Lb41 of the PRT which acts as the drive transformer, the damping resistor Rb41 and the fixed time constant capacitor Cb41. Such self resonating circuit supplies a resonating frequency signal to the switching transistor Q41 so as to control the switching operation thereof. Similarly, the switching operation for the switching transistor Q42 is controlled by the self resonating circuit made up of winding Lb42 of the PRT which acts as the drive transformer, the damping resistor Rb42 and the fixed time constant capacitor Cb42. In a similar manner, the switching operation for the switching transistor Q43 is controlled by the self resonating circuit made up of winding Lb43 of the PRT which acts as the drive transformer, the damping resistor Rb43 and the fixed time constant capacitor Cb43; and the switching operation for the switching transistor Q44 is controlled by the self resonating circuit made up of winding Lb44 of the PRT which acts as the drive transformer, the damping resistor Rb44 and the fixed time constant capacitor Cb44.

The circuit 218 further includes resistors R41, R42, R43 and R44 and base clamping diodes D43, D44, D45 and D46 for the switching transistors Q41, Q42, Q43 and Q44.

Further, as shown in FIG. 36, the cathode of the connection diode D41A of the voltage resonance converter 117A is coupled between the switching transistors Q43 and Q44. Similarly, the cathode of the connection diode D41B of the voltage resonance converter 117B is coupled between the switching transistors Q41 and Q42.

FIGS. 37(a) through 37(f) illustrate wave forms and the phase relationship for the various switching currents when a relatively heavy load is present.

In circuit 218, to proportionally maintain rises in the a.c. input voltage with light voltage loads, the switching frequency is controlled so as to be increased by controlling the d.c. control current flowing through the control winding LC of the PRT in the switching power supply circuit 318. As a result, as in the thirteenth embodiment, the power efficiency is kept constant even if there are variations in the a.c. input voltage or the load.

Figure 38:
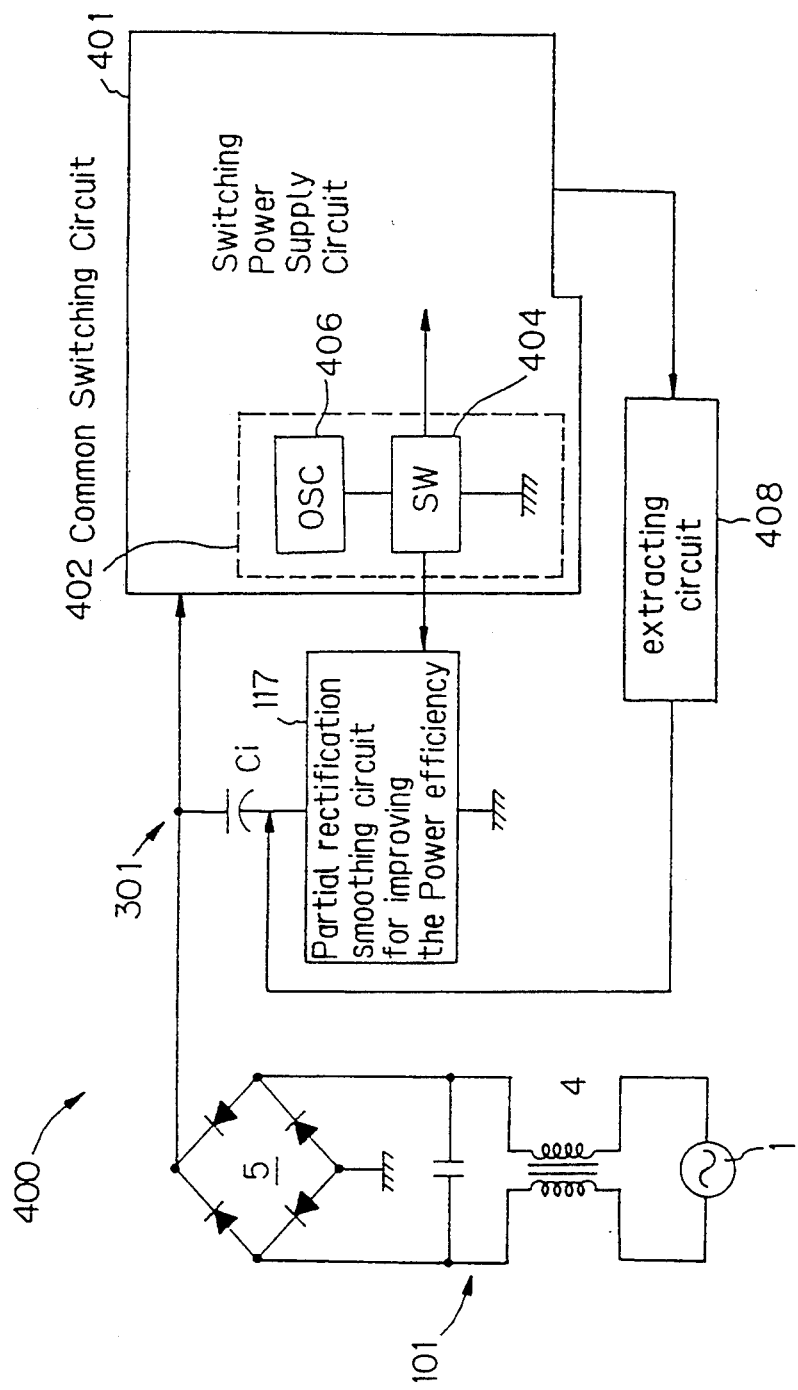
FIG. 38 is a circuit diagram of another switching power supply apparatus according to another embodiment of the present invention.

Although in describing the above embodiments of the present invention, the features included in the embodiments were not combined, the present invention is not so limited, but may be applied to any combination of two or more of the above embodiments. For example, a switching power source apparatus may have an extracting circuit (as in the first through fifth embodiments) and utilize a common switching device for the partial rectification smoothing circuit and the switching power supply circuit (as in the twelfth through seventeenth embodiments). An example of such apparatus is illustrated in FIG. 38. As shown therein, in addition to an input circuit 101, a partial rectification smoothing circuit 301 and a switching power circuit 401, the circuit 400 includes an extracting circuit 408 and a common switching circuit 402 (which is included in the circuit 401). Such common switching circuit 402 includes a switching device 404 and an oscillation signal generator 406. The extracting circuit 408 and the common switching circuit 402 may be respectively constructed as described with reference to embodiments 1–5 and 12–17.

As another example, a switching power source apparatus may have an extracting circuit and utilize a common oscillation signal for the partial rectification smoothing circuit and the switching power supply circuit. As previously mentioned, a switching power source apparatus may be provided which includes any combination of the above-described embodiments.

Furthermore, although in describing the above embodiments specific component(s) were identified as being in a respective circuits the present invention is not so limited, but instead the individual component or components may be included in another circuit included in the apparatus.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. A switching power source apparatus receiving alternating voltage signals from an AC input power source for producing a power signal with a relatively high efficiency, said apparatus comprising:
   rectifying means for rectifying the received alternating voltage signals so as to produce a direct current pulsating voltage signal;
   means for smoothing said direct current pulsating voltage signal so as to produce a smoothed direct current signal, said smoothed direct current signal having a ripple current component;
   switching power supply circuit including one of a power choking coil and a transformer for producing said power signal with said relatively high efficiency, said one of said power choking coil and said transformer having a plurality of windings including a low voltage winding;
   extracting means for extracting a low voltage signal from said low voltage winding; and
   means for superposing the extracted low voltage signal on said smoothed direct current signal so as to reduce said ripple current component of said smoothed direct current signal and for supplying the smoothed direct current signal having a reduced ripple current component to said switching power supply circuit, whereupon said switching power supply circuit produces said power signal.

2. A switching power source apparatus according to claim 1, wherein said rectifying means has a negative terminal and wherein said extracting means is coupled to said negative terminal of said rectifying means.

3. A switching power source apparatus according to claim 1, wherein the smoothing means includes a rectification smoothing circuit having a second transformer, switching means coupled to said second transformer and responsive to an oscillation signal for controlling the flow of signals through said smoothing means, and oscillation means for generating said oscillation signal having a predetermined frequency and for supplying the same to said switching means.

4. A switching power source apparatus according to claim 3, wherein said first resonance converting circuit is a current resonance converter which operates in accordance with a switching frequency control technique.

5. A switching power source apparatus according to claim 4, wherein said one of said power choking coil and said transformer is said transformer and wherein said transformer is a power isolation transformer which includes said plurality of windings including said low voltage winding.

6. A switching power source apparatus according to claim 5, wherein said current resonance converter includes a power regulating transformer and said power isolation transformer.

7. A switching power source apparatus according to claim 6, wherein said power isolation transformer includes a primary winding wound on one side of said power isolation transformer and wherein said low voltage winding is wound on the same side of said power isolation transformer as said primary winding.

8. A switching power source apparatus according to claim 6, wherein said switching power supply circuit further includes a second resonance converting circuit.

9. A switching power source apparatus according to claim 8, wherein said second resonance converting circuit includes:
   first oscillating means for producing a first oscillating signal having a first frequency;
   first switching means responsive to said first oscillating signal for controlling the flow of signals into said switching power circuit;
   second oscillating means for producing a second oscillating signal having a second frequency which is anti-phase as compared with said first oscillating signal; and
   second switching means coupled to said first switching means and ground for controlling the flow of signals through said switching power supply circuit in response to said second oscillating signal.

10. A switching power source apparatus according to claim 1, wherein said switching power supply circuit includes a first resonance converting circuit.

11. A switching power source apparatus according claim 10, wherein said first resonance converting circuit is a voltage resonance converter which operates in accordance with a magnetic flux control technique.

12. A switching power source apparatus according to claim 11, wherein said one of said power choking coil and said transformer is said power choking coil which includes said plurality of windings including said low voltage winding.

13. A switching power source apparatus according to claim 12, wherein said voltage resonance converter includes said power choking coil and a power regulating transformer.

14. A switching power source apparatus according to claim 13, wherein said power choking coil includes a first winding wound on one side of said power choking coil, a second winding wound on the other side of said power choking coil, and a third winding wound on the same side of said power choking coil as said second winding.

15. A switching power source apparatus according to claim 14, wherein said third winding of said power choking coil is said low voltage winding.

16. A switching power source apparatus according to claim 10, wherein said first resonance converting circuit is a current resonance converter which operates in accordance with a serial oscillation frequency control technique.

17. A switching power source apparatus according to claim 16, wherein said one of said power choking coil and said transformer is said transformer and wherein said transformer is a power regulating transformer which includes said plurality of windings including said low voltage winding.

18. A switching power source apparatus according to claim 17, wherein said current resonance converter includes a converter driven transformer and said power regulating transformer.

19. A switching power source apparatus according to claims, wherein said power regulating transformer includes a primary winding wound on one side of said power regulating transformer and wherein said low voltage winding is wound on the same side of said power regulating transformer as said primary winding.

20. A switching power source apparatus according to claim 18, wherein said switching power supply circuit further includes a second resonance converting circuit.

21. A switching power source apparatus according to claim 20, wherein said second resonance converting circuit includes:
   first oscillating means for producing a first oscillating signal;
   first switching means responsive to said first oscillating signal for controlling the flow of signals into said switching power circuit;
   second oscillating means for producing a second oscillating signal which is anti-phase as compared with said first oscillating signal; and
   second switching means coupled to said first switching means and ground for controlling the flow of signals through said switching power supply circuit in response to said second oscillating signal.

22. A switching power source apparatus according to claim 10, wherein said first resonance converting circuit is a rectangular wave-type converter.

23. A switching power source apparatus according to claim 22, wherein said switching power supply circuit further includes means for generating pulse width modulation signals and wherein said rectangular wave-type converter is driven by said pulse width modulation signals.

24. A switching power source apparatus according to claim 22, wherein said rectangular wave-type converter includes a ringing choke converter.

25. A switching power source apparatus according to claim 24, wherein said one of said power choking coil and said transformer is said transformer and wherein said transformer is a converter transformer which includes said plurality of windings and said low voltage winding.

26. A switching power source apparatus according to claim 25, wherein said ringing choke converter includes a converter transformer.

27. A switching power source apparatus according to claim 26, wherein said converter transformer includes a first winding wound on one side of said converter transformer, a second winding wound on the other side of said converter transformer, and a third winding wound on the same side of said converter transformer as said second winding.

28. A switching power source apparatus according to claim 27, wherein said third winding of said converter transformer is said low voltage winding.

29. A switching power source apparatus according to claim 22, wherein said one of said power choking coil and said transformer is said transformer and wherein said transformer is a converter transformer which includes said plurality of windings and said low voltage winding.

30. A switching power source apparatus according to claim 29, wherein said rectangular wave-type converter includes a converter transformer.

31. A switching power source apparatus according to claim 30, wherein said converter transformer includes a first winding wound on one side of said converter transformer, a second winding wound on the other side of said converter transformer, and a third winding wound on the same side of said converter transformer as said second winding.

32. A switching power source apparatus according to claim 31, wherein said third winding of said converter transformer is said low voltage winding.

33. A switching power source apparatus receiving alternating voltage signals from an AC input power source for producing a power signal, said apparatus comprising:
   rectifying means for rectifying the received alternating voltage signals so as to produce a direct current pulsating voltage signal;
   smoothing means for smoothing said direct current pulsating voltage so as to produce a smoothed direct current signal, said smoothing means including a rectification smoothing circuit having a transformer and first switching means coupled to said transformer for controlling the flow of signals through said smoothing means in response to a common oscillation signal;
   switching power supply circuit for receiving said smoothed direct current signal and for producing said power signal therefrom, said power supply circuit having second switching means responsive to said common oscillation signal for controlling the flow of signals through said switching power supply circuit; and
   common oscillation means for generating said common oscillation signal and for supplying the generated common oscillation signal to said first and second switching means.

34. A switching power source apparatus according to claim 33, wherein said switching power supply circuit further includes third switching means for controlling the flow of said smoothed direct current signal from said smoothing means in response to a second oscillation signal, and second oscillation means for generating said second oscillation signal.

35. A switching power source apparatus according to claim 34, wherein said common oscillation signal is anti-phase as compared with said second oscillation signal and wherein said second switching means is coupled to said third switching means and ground.

36. A switching power source apparatus according to claim 33, wherein said switching power supply circuit includes a resonance converter circuit.

37. A switching power source apparatus according to claim 36, wherein said resonance converter is a current resonance converter which operates in accordance with a switching frequency control technique.

38. A switching power source apparatus according to claim 37, wherein said current resonance converter includes a power regulating transformer and a power isolation transformer.

39. A switching power source apparatus according to claim 36, wherein said resonance converter circuit is a current resonance converter which operates in accordance with a serial oscillation frequency control technique.

40. A switching power source apparatus according to claim 39, wherein said current resonance converter includes a converter driven transformer and a power regulating transformer.

41. A switching power source apparatus according to claim 36, wherein said resonance converting circuit is a voltage resonance converter which operates in accordance with a magnetic flux control technique.

42. A switching power source apparatus according to claim 41, wherein said voltage resonance converter includes a power choking coil and a power regulating transformer.

43. A switching power source apparatus according to claim 36, wherein said resonance converter circuit is a rectangular wave-type converter.

44. A switching power source apparatus according to claim 43, wherein said switching power supply circuit further includes means for generating pulse width modulation signals and wherein said rectangular wave-type converter is driven by said pulse wide modulation signals.

45. A switching power source apparatus according to claim 44, wherein said switching power supply circuit further includes a transformer having primary and secondary windings, a diode coupled in series to said secondary winding, and a smoothing capacitor coupled in parallel to said second winding.

46. A switching power source apparatus according to claim 44, wherein said switching power supply circuit further includes a transformer having primary and secondary windings, a plurality of diodes coupled to said secondary winding, and a reactor coupled to one of said diodes.

47. A switching power source apparatus according to claim 43, wherein said rectangular wave-type converter is a ringing choke converter.

48. A switching power source apparatus receiving alternating voltage signals from an AC input power source for producing a power signal, said apparatus comprising:
rectifying means for rectifying the received alternating voltage signals so as to produce a direct current pulsating voltage signal;
means including a rectification smoothing circuit for smoothing said direct current pulsating voltage signal so as to produce a smoothed direct current signal;
switching power supply circuit for receiving said smoothed direct current signal and for producing therefrom said power signal; and
common switching means coupled to the smoothing means and said switching power supply circuit for controlling the flow of signals through said smoothing means and said switching power supply circuit.

49. A switching power source apparatus according to claim 48, wherein said switching power source supply circuit includes a resonance converter circuit.

50. A switching power source apparatus according to claim 49, wherein said resonance converter circuit is a current resonance converter which operates in accordance with a serial oscillation frequency control technique.

51. A switching power source apparatus according to claim 50, wherein said current resonance converter includes a converter driven transformer and a power regulating transformer.

52. A switching power source apparatus according to claim 49, wherein said resonance converter circuit is a current resonance converter which operates in accordance with a switching frequency control technique.

53. A switching power source apparatus according to claim 52, wherein said current resonance converter includes a power regulating transformer and a power isolation transformer.

54. A switching power source apparatus according to claim 48, wherein said rectification smoothing circuit includes a inductance, a resonance capacitor coupled to said inductance, and a diode coupled to said resonance capacitor and said common switching means.

55. A switching power source apparatus according to claim 49, wherein said resonance converter circuit is a voltage resonance converter which operates in accordance with a magnetic flux control technique.

56. A switching power source apparatus according to claim 55, wherein said voltage resonance converter includes a power choking coil and a power regulating transformer.

57. A switching power source apparatus according to claim 49, wherein said resonance converter circuit is a rectangular wave-type converter.

58. A switching power source apparatus according to claim 57, wherein said rectangular wave-type converter is a ringing choke converter.

59. A switching power source apparatus according to claim 57, wherein said switching power supply circuit further includes means for generating pulse width modulation signals and wherein said rectangular wave-type converter is driven by said pulse wide modulation signals.

60. A switching power source apparatus according to claim 59, wherein said switching power supply circuit further includes a transformer having primary and secondary windings, a plurality of diodes coupled to said secondary winding, and a reactor coupled to one of said diodes.

61. A switching power source apparatus according to claim 59, wherein said switching power supply circuit further includes a transformer having primary and secondary windings, a diode coupled in series to said secondary winding, and a smoothing capacitor coupled in parallel to said secondary winding.

62. A switching power source apparatus receiving alternating voltage signals from an AC input power source for producing a power signal, said apparatus comprising:
rectifying means for rectifying the received alternating voltage signals so as to produce a direct current pulsating voltage signal;
first and second smoothing means respectively including first and second rectification smoothing circuits for smoothing said direct current pulsating voltage signal so as to produce a smoothed direct current signal;
a power regulating transformer having primary and secondary windings;
full-bridge converting means having first and second switching means coupled to said power regulating transformer for receiving said smoothed direct current signal and for producing therefrom said power signal; and
first and second coupling means for respectively coupling said first and second rectification smoothing circuits with said first and second switching means.

63. A switching power source apparatus according to claim 62, wherein said first switching means includes first and second transistors which are coupled together, said second switching means includes third and forth transistors which are coupled together, said first coupling means includes a first diode and is coupled to said first and second transistors, and said second coupling means includes a second diode and is coupled to said third and fourth transistors.

* * * * *